(12) United States Patent
Pan et al.

(10) Patent No.: US 12,524,231 B2
(45) Date of Patent: Jan. 13, 2026

(54) SOFTWARE VERSION CONTROL USING FORECASTS AS COVARIATE FOR EXPERIMENT VARIANCE REDUCTION

(71) Applicant: DoorDash, Inc., San Francisco, CA (US)

(72) Inventors: Qiyun Pan, Mountain View, CA (US); Ryan Scott Schork, San Francisco, CA (US); Yixin Tang, Milbrae, CA (US); Caixia Huang, Mountain View, CA (US); Swaroop Chitlur Haridas, San Ramon, CA (US)

(73) Assignee: DOORDASH, INC., San Francisco, CA (US)

( * ) Notice: Subject to any disclaimer, the term of this patent is extended or adjusted under 35 U.S.C. 154(b) by 217 days.

(21) Appl. No.: 18/536,037

(22) Filed: Dec. 11, 2023

(65) Prior Publication Data
US 2024/0211250 A1    Jun. 27, 2024

Related U.S. Application Data

(60) Provisional application No. 63/433,387, filed on Dec. 16, 2022.

(51) Int. Cl.
G06F 8/71      (2018.01)
G06F 11/34    (2006.01)

(52) U.S. Cl.
CPC ............ *G06F 8/71* (2013.01); *G06F 11/3466* (2013.01)

(58) Field of Classification Search
None
See application file for complete search history.

(56) References Cited

U.S. PATENT DOCUMENTS

| | | |
|---|---|---|
| 6,384,850 B1 | 5/2002 | McNally et al. |
| 6,871,325 B1 | 3/2005 | McNally et al. |
| 6,982,733 B1 | 1/2006 | McNally et al. |
| 8,146,077 B2 | 3/2012 | McNally et al. |
| 9,009,060 B2 | 4/2015 | McNally |
| 9,747,651 B2 | 8/2017 | McNally |

(Continued)

FOREIGN PATENT DOCUMENTS

WO    0122289 A1    3/2001

OTHER PUBLICATIONS

Deng, "Improving the Sensitivity of Online Controlled Experiments by Utilizing Pre-Experiment Data", 2013, ACM (Year: 2013).*

(Continued)

*Primary Examiner* — Hossain M Morshed
(74) *Attorney, Agent, or Firm* — Kilpatrick Townsend & Stockton LLP

(57) ABSTRACT

Various embodiments can reduce variance in a target metric (e.g., experiment outcome). Embodiments can use historical pre-experiment outcomes to predict a metric (forecasts) that is expected for a future measurement time. The forecasts can then be used as a covariate to reduce the variance of the target metric. When predicting forecasts, various embodiments can use an automation pipeline that can generate better and quicker forecasts. When there are multiple covariates that may be considered to reduce variance in the target metric, various embodiments can use a closed from solution for determining optimal coefficient of each covariate.

20 Claims, 15 Drawing Sheets

(56) References Cited

U.S. PATENT DOCUMENTS

| | | | |
|---|---|---|---|
| 10,970,797 | B2 | 4/2021 | McNally |
| 11,276,130 | B2 | 3/2022 | McNally |
| 11,842,415 | B2 | 12/2023 | McNally |
| 11,847,587 | B1 | 12/2023 | McNally |
| 12,190,156 | B2 * | 1/2025 | Mathew ............... G06F 11/079 |
| 2014/0249937 | A1 | 9/2014 | McNally |
| 2023/0069406 | A1 * | 3/2023 | Chklovski .......... G06Q 30/0204 |
| 2024/0346389 | A1 * | 10/2024 | Pan ....................... G06N 3/045 |

OTHER PUBLICATIONS

Drutsa, "Future User Engagement Prediction and Its Application to Improve the Sensitivity of Online Experiments", 2015, ACM (Year: 2015).*

Li, Jeff et al., "Improving Experimental Power through Control Using Predictions as Covariate (CUPAC)", (Jun. 8, 2020), retrieved from the Internet on Dec. 11, 2023, https://doordash.engineering/2020/06/08/improving-experimental-power-through-control-using-predictions-as-covariate-cupac/.

Zhang, Jessica et al., "Improving Online Experiment Capacity by 4X with Parallelization and Increased Sensitivity", (Oct. 7, 2020), retrieved from the Internet on Dec. 11, 2023, https://doordash.engineering/2020/10/07/improving-experiment-capacity-by-4x/.

Glynn, P.W., Szechtman, R., "Some New Perspectives on the Method of Control Variates", In: Fang, KT., Niederreiter, H., Hickernell, F.J. (eds.), *Monte Carlo and Quasi-Monte Carlo Methods* (Mar. 5, 2002). Springer, Berlin, Heidelberg. https://doi.org/10.1007/978-3-642-56046-0_3.

Seltman, Howard, "Approximations for Mean and Variance of a Ratio", (Aug. 28, 2017), retrieved from the Internet on Dec. 11, 2023, https://www.stat.cmu.edu/~hseltman/files/ratio.pdf.

Civil Action No. 2:23-CV-2165-WSH, Amended Complaint for Patent Infringement—*Ameranth, Inc.*, Plaintiff, V. *Doordash, Inc., Eat'n Park Restaurants, LLC, and Eat'n Park Hospitality Group, Inc.*, Defendants, Sep. 17, 2024, pp. 1-91.

Unpublished U.S. Appl. No. 18/145,942, filed Dec. 23, 2022.

* cited by examiner

SOFTWARE VERSION CONTROL USING FORECASTS AS COVARIATE FOR EXPERIMENT VARIANCE REDUCTION

CROSS-REFERENCES TO RELATED APPLICATIONS

The present application claims priority from and is a non provisional application of U.S. Provisional Application No. 63/433,387, entitled "Software Version Control Using Forecasts As Covariate For Experiment Variance Reduction" filed Dec. 16, 2022, the entire contents of which are herein incorporated by reference for all purposes.

BACKGROUND

Experimental analysis is a powerful statistical tool for making important decisions and actions, e.g., when and how to update software. For example, an individual or a group of individuals (e.g., company) can perform experimental analysis (e.g., A/B testing) that analyzes data to see if a treatment variable has a desired effect on an output. However, the experimental analysis suffers from long running time to achieve reasonable experiment power level (e.g., the treatment variable being statistically significant to the output). The result is that software is updated infrequently, causing problems in the development cycle.

Embodiments of the disclosure address this problem and other problems individually and collectively.

SUMMARY

Various embodiments of the present disclosure provide for improved techniques for running experimental measurements with software running on client devices for updating software in the client devices.

In some embodiments, a method can provide a first version of a software application having a first option for a particular functionality of the software application, wherein clients of the software application belong to a plurality of categories. For each category of the plurality of categories, the method can measure a set of first values of a performance metric of the clients using the software application, the set of first value measured over a first time period. The method can then determine a predicted value of the performance metric for each of the plurality of categories of the clients during a second time period, the predicted value determined based on the set of first values of the performance metric during the first time period, the predicted value accounting for a temporal behavior of the set of first values of the performance metric. The method can provide a second version of the software application having a second option for the particular functionality of the software application and measure a second value of the performance metric for each of the plurality of categories of the clients during the second time period. The method can then, for each of the plurality of categories of the clients, determine an auxiliary metric using the second value of the performance metric and the predicted value and compare the second version of the software application to the first version of the software application using the auxiliary metric for each of the plurality of categories of the clients.

These and other embodiments of the disclosure are described in detail below. For example, other embodiments are directed to systems, devices, and computer readable media associated with methods described herein.

A better understanding of the nature and advantages of embodiments of the invention may be gained with reference to the following detailed description and accompanying drawings.

TERMS

Figure 1:
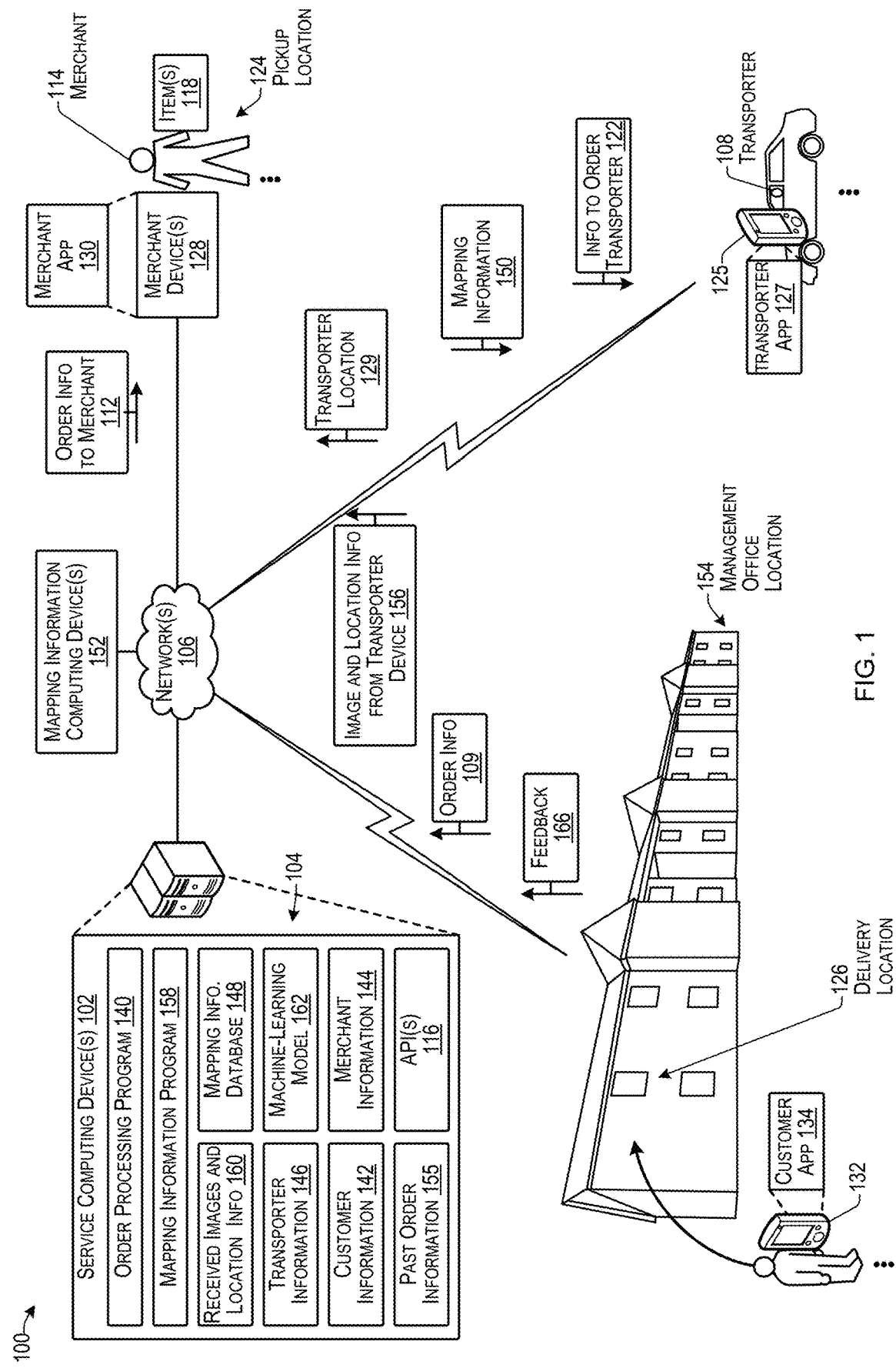
FIG. 1 illustrates an example distributed computing system measuring a variety of information according to some implementations to perform an experimental analysis.

Prior to discussing embodiments of the disclosure, some terms can be described in further detail.

A "client computer" may refer to a computer that uses the services of other computers or devices, such as server computers. A client computer may connect to these other computers or devices over a network such as the Internet. As an example, a client computer may comprise a laptop computer that connects to an image hosting server in order to view images stored on the image hosting server.

A "user" may include an individual. In some embodiments, a user may be associated with one or more personal accounts and/or mobile devices. The user may also be referred to as a cardholder, account holder, or consumer in some embodiments.

A "user device" may be any suitable device that a user can interact with (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "treatment variable" may be an independent variable that may be changed to determine causal effects on output. The treatment variable can be used in an A/B testing to compare two groups/versions. As an example, a change in user interface (UI) in a software application can be analyzed to see if there was an increase in performance of the software. The change in user interface (UI) can be a treatment variable and the performance can be the output.

DETAILED DESCRIPTION

An individual or a group of individuals (e.g., company) can perform an experimental analysis (e.g., A/B testing) that analyzes data to see if a treatment variable has a desired effect on an output. For example, a food delivery company can analyze whether a change to positioning measurements or mapping (treatment variable) affects the delivery time (output). Another example can be a computer testing whether a new user interface (UI) in its application (treatment variable) increases the number of users (outcome). A component in performing the experimental analysis is to check that the treatment variable has a high level of statistical significance to the output, i.e., high experiment power.

Four factors that affect the power of a statistical test include a significance level, difference between group means, variance in outcome, and sample size. Since the means of the collected data cannot be manipulated and the level of significance is usually fixed (e.g., 95% confidence level) to guarantee a high experiment power, the two main factors that can be adjusted are the variance and the sample size. The variance is inversely proportional while the sample size is directly proportional to the statistical test (i.e., experiment power).

Although having a big sample size can increase the level of statistical significance (e.g., increase experiment power), the big sample size can lead to long running time in performing the experimental analysis, especially when the variance is large and the desired detectable difference (difference between group means of a control group and a treatment group) is small. To reduce the running time, the variance can be reduced to achieve the same experiment power level at a smaller sample size.

Embodiments can reduce variance in a target metric (e.g., experiment outcome). The embodiment can use historical pre-experiment outcomes to predict a metric (forecasts) that is expected for a future measurement time. The embodiment can then generate an auxiliary metric using the target metric and the predicted (forecast) metric. The predicted metric is used as a covariate to reduce variance in the target metric. The auxiliary metric can have a variance that is smaller than the target metric, as some of the variance in the target metric is accounted by the predicted metric. The predicted metric can act as a covariate to reduce the variance.

Embodiments can determine forecasts for the predicted metric using an automation pipeline. The automation pipeline can automate necessary adjustments when building the forecasts, thereby decreasing human effort. Additionally, the automation pipeline can track and organize different adjustments made by a user such that the user can compare different forecasts and select the best forecast to be used in reducing variance of the target metric.

Embodiments can use a closed form solution to determine optimal coefficients when there are multiple control variates. As opposed to an iterative solution for determining an optimal coefficient each control variate, the solution can estimate multiple optimal coefficients simultaneously. The closed form solution accounts for a global optimum as it does not separate each covariate but estimate all the multiple optimal coefficients simultaneously as a whole.

I. Example Software and System

Software may be identified to change as a result of improved performance. An example of such software includes applications that execute on mobile devices and communicate with a server. Such an application includes a delivery application for which transporters may receive orders and deliver items. The software can also run on merchant devices and on customer devices.

FIG. 1 illustrates an example distributed computing system 100 measuring variety of information (e.g., delivery time, number of orders per customer, etc.) according to some implementations. For instance, the system 100 may enable one or more service computing devices 102 associated with a service provider 104 to measure delivery information received over one or more networks 106 from one or more transporters 108.

Some example implementations are described in the environment of one or more service computing devices 102 that manage a network of transporters 108 to perform an experimental analysis using the measured information to improve performance in different areas. However, implementations herein are not limited to the particular examples provided, and may be extended to other service environments, other system architectures, other types of transporters, other types of deliveries, other types of mapping information, and so forth, as will be apparent to those of skill in the art in light of the disclosure herein.

In the illustrated example, the service computing devices 102 may be configured to provide a service to receive, over the one or more networks 106, order information 109 from a customer 110. For instance, the order information 109 may include an indication of an item and an indication of a delivery location. The delivery location may be explicitly specified with the order information or, alternatively, may be implied to be a default delivery location already associated with a customer account of the customer 110. Based on the order information 109 received from the customer 110, the service computing device 102 may send order information 112 to at least one particular merchant 114 of a plurality of merchants that will provide a requested item 118. The particular merchant 114 may receive the order information 112, and may respond with a confirmation to confirm that the request for the item 118 has been received and the item 118 will be provided by the merchant 114.

In response to receiving the confirmation from the particular merchant 114, the service computing device 102 may send order information 122 to an transporter device 125 of a selected transporter 108 who, upon accepting the delivery job, will pick up the order from the merchant 114 and deliver the order to the customer 110. For instance, each merchant 114 may be associated with a respective pickup location 124, which may typically be the merchant's place of business. Furthermore, each customer 110 may be associated with a respective delivery location 126, which as mentioned above, may be determined by the service computing device 102 when the order information 109 is received from the customer 110.

The order information 122 sent to the transporter device 125 may include item information, the pickup location 124 for the order, the pickup time, the delivery location 126, and a delivery time for the order. Further, while one transporter 108, one customer 110, and one merchant 114 are shown in this example for clarity of illustration, a large number of transporters 108, customers 110, and merchants 114 may individually participate in the system 100.

In the illustrated example, the service computing device 102 of the service provider 104 is able to communicate with the transporter device 125 over the one or more networks 106. Each transporter 108 may be associated with a respective transporter device 125 that may execute a respective instance of an transporter application 127. For example, the transporters 108 may use transporter devices 125, such as smart phones, tablet computers, wearable computing devices, laptops, or the like, as further enumerated elsewhere herein, and these transporter devices 125 may have installed thereon the transporter application 127. The transporter application 127 may be configured to receive the order information 122 from the service computing device 102 to provide a particular transporter 108 with information for picking up a particular order from a merchant's pickup location 124 and for delivering the order to a customer's delivery location 126. The transporter application 127 may further enable the transporter 108 to respond to the service computing device 102 to confirm acceptance of a delivery job.

Additionally, in some cases, the transporter application 127 may provide the service computing device 102 with an indication of a current transporter location 129 of a particular transporter 108. For example, the transporter application 127 may obtain the current location from a GPS receiver (not shown in FIG. 1) included onboard the transporter device 125. As mentioned above, the term "GPS" as used herein may include any global navigation satellite system (GNSS) such as the Global Positioning Satellite (GPS) system, the Russian Global Navigation Satellite System (GLONASS), the Chinese BeiDou Navigation Satellite System (BDS), the European Union's Galileo system, the Japanese Quasi-Zenith Satellite System (QZSS), the Indian Regional Navigation Satellite System (IRNSS), any other satellite-based location positioning system, or any similar such system for providing accurate indications of current location to a mobile device. Accordingly the GPS receiver herein may be able to determine the location 129 (e.g., latitude and longitude) of the transporter device 125 based on received signals from one or more satellite positioning systems or the like. Additionally, in some examples, the transporter application 127 and the service computing device 102 may communicate with each other via one or more application programming interfaces (APIs) 116.

Each merchant device 128 may be associated with a respective merchant 114. Each merchant device 128 may be a computing device, such as a desktop, laptop, tablet, smart phone, or the like, and may include a respective instance of a merchant application 130 that executes on the respective merchant device 128. For example, the merchant application 130 may be configured to communicate with the service computing device 102, such as for receiving the order information 112 and for sending a confirmation. In some examples, the merchant application 130 and the service computing device 102 may communicate with each other via one or more APIs 116

In addition, the customers 110 may be associated with respective customer devices 132 that may execute respective instances of a customer application 134. For example, the customers 110 may use the customer devices 132, such as smart phones, tablet computers, wearable computing devices, laptops, desktops, or the like, and these customer devices 132 may have installed thereon or may otherwise access the customer application 134. The customer application 134 may enable the customer 110 to select one or more items 118 to purchase from one or more of the merchants 114 to be delivered to the customer 110 by one or more of the transporters 108. For example, the customer application 134 may present one or more UIs on a display of the transporter device 132 for enabling the customer 110 to select one or more items 118 for an order. In some examples, the customer application 134 and the service computing device 102 may communicate with each other via one or more APIs 116. Additionally, or alternatively, the customer application 134 may be a browser, or the like, and the customer 110 may navigate to a website or load a web application associated with the service provider 104, and may use the website or web application received from the service computing device(s) 102 to place an order.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH®; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant device(s) 128, the customer device(s) 132, and/or the transporter device(s) 125 are able to communicate over the one or more networks 106 using wired or wireless connections and combinations thereof.

In the illustrated example, the service computing device 102 includes an order processing program 140 that may be executed on the service computing device 102 to provide, at least in part, the functionality attributed to the service computing device 102. The order processing program 140 may receive the order information 109 from the customer 110 and may associate the order information 109 with customer information 142 and merchant information 144. For instance, based on customer identifying information that may be included with the order information 109, the order processing program 140 may associate particular order information 109 with a particular customer account. Further, based on a particular merchant 114 identified by the order information 109, the order processing program 140 may associate the order information 109 with a merchant account of a particular merchant 114 to send the order information 112 to the merchant 114.

In addition, the order processing program 140 may access transporter information 146 to determine transporter contact information for sending the order information 122 to a particular transporter 108 to determine whether the particular transporter 108 is willing to accept the delivery job of delivering the order to the customer 110. The particular transporter 108 may use the transporter application 127 on the transporter device 125 to receive a message with information about the order, and to respond with acceptance of the delivery job if the job is accepted. The particular transporter 108 may subsequently pick up the order from the particular merchant 114 and deliver the order to the particular customer 110 at a specified delivery location 126.

When the transporter 108 has completed delivery of the order to the delivery location 126, the transporter 108 may use the transporter application 127 to inform the order processing program 140 that the delivery has been completed. Upon receiving the indication of completion, the order processing program 140 may store information related to the order and completion of the order as past order information 155.

In addition, in association with providing notification of order completion, the transporter 108 may capture an image of the delivery location 126, and may include in the image the item 118 delivered to the delivery location 126. Furthermore, at least one of the transporter application 127 or a separate camera application may be used to capture the image, and may be configured to access the GPS receiver on the transporter device 125 when the image is captured and may associate a detected latitude and longitude with the captured image. The transporter application 127 may send the image and location information 156 from the transporter device 125 to the service computing device 102 over the one or more networks 106.

The order processing program 140 may receive the image and location information 156 from the transporter device 125 and may provide this received information to a mapping information program 158 that may be executed on the one or more service computing devices 102. For example, the mapping information program 158 may receive the image and location information 156 and may temporarily store the image and location information with received images and location information 160. The mapping information program 158 may correlate the received information with the customer account and/or the delivery location 126 in the customer information 142.

In addition, the mapping information program 158 may use the received image as input to a machine-learning model 162. The machine learning model 162 may be executed to determine whether to rely on the location information included with the received image of a delivery location for generating high-resolution mapping information. For instance, the machine-learning model 162 may be trained to account for pieces of information included in the received images. In some cases, the machine-learning model may be initially trained using a set of training data. For example, the machine-learning model 162 may be trained using training data that includes previously received images for a large number of past orders included in the past order information 155. The trained machine learning model 162 may be checked for accuracy using another portion of past order information 155, and may then be deployed for use in determining whether received images include a threshold amount of information for a delivery location to trust that the associated location information indicates the correct delivery location. The machine-learning model 162 may be periodically updated and re-trained based on new training data to keep the machine-learning model 162 up to date and accurate.

As one example, a received image may be determined by the machine-learning model 162 to include at least the threshold amount of information if the received image includes an image of an entrance or other entryway, doorway, etc., of an apartment unit, condominium unit, townhouse, house, an office, a motel room, or other densely populated high occupancy structure. As one non-limiting example, a received image that includes at least a portion of a door and doorframe of the delivery location and the delivered item 118 in the received image might be determined to have the threshold amount of information in some cases.

Further, as another example, the received image may include an apartment number, suite number, room number, or other identifying alphanumeric information indicating a distinct unit number corresponding to the delivery location. For instance, the machine-learning model 162 may be trained to recognize the identifying alphanumeric information in a received image. The machine-learning model 162 or an associated algorithm included in the mapping information program 158 may perform character recognition on the alphanumeric information included in the received image, and may compare the recognized character(s) with the delivery address or other previously provided delivery location information to determine whether the alphanumeric information recognized in the received image matches a unit number in the delivery address information provided by the customer. If so, this may weigh strongly in favor of the image including the threshold amount of information. On the other hand, if the alphanumeric information recognized in the received image does not match the provided delivery address, then this may weigh strongly against the image being determined to include the threshold amount of information despite the image including an entrance, door, delivered item, etc.

In some cases, if a matching unit number is identified in a received image, then a higher level of confidence may be associated with the received location information for that image. On the other hand, if the image does not include a matching unit number, then lower levels of confidence may be associated with the received location information depending on the amount of other information included in the respective images. Nevertheless, if the received image is determined to have at least the threshold amount of information to be trustworthy (e.g., with a higher level of confidence or a lower level of confidence), the associated location information (e.g., a latitude and longitude associated with the received image) may be added to the mapping information database 148 and associated with the delivery location 126, such as by being associated with a delivery address and a unit number, or the like. Subsequently, the stored latitude and longitude information for the delivery location 126 may be used to provide high resolution mapping information to an transporter 108 the next time an item is ordered for delivery to that particular delivery location 126. On the other hand, if the machine learning model 162 determines that a received image does not include at least the threshold amount of information, the location information received with that image is not added to the mapping information database 148.

In addition, in some examples, the service computing device 102 may receive feedback 166 from the customer application 134 on the customer device 132. For example, the customer may send feedback 166 such as in the form of structured or unstructured data indicating that the item was not received or that the item was left at the incorrect location. In this event, the mapping information program 158 may receive the feedback 166 and may determine whether location information was stored to the mapping information database 148 based on the delivery for which the feedback 166 was received. If so, the mapping information program 158 may remove the mapping information generated for the particular delivery location 126 from the mapping information database 148 based on the feedback 166 indicating that the item was left at the wrong address or not received.

Throughout the process of delivery, all the measurements (e.g., location, delivery time, order information, etc.) are sent to the service computing device 102. The service computing device 102 can store these measurements and later perform the experimental analysis to improve different fields such as shortening delivery time, increasing number of orders per customer, etc.

II. Experimental Analysis

Some examples of the experimental analysis can involve an individual or a group of individuals with a server computer performing an A/B testing on a first software application having a first option for a particular functionality and a second software application (i.e., a different version of the software) with a second option for the particular functionality to determine which software application has better experimental outcome. The first option can be when a treatment variable is not applied, and the second option can be when the treatment variable is applied. For example, as described above, a food delivery company can perform A/B testing on a first software application having an old UI to perform delivery related functionalities and a second software application having a new UI to perform the same delivery related functionalities. Example UI changes can include changing a design of a button (e.g., removing, adding, changing color, font zie, options in a dropdown list, etc.). Some other examples of the particular functionality can include recommendation algorithm, frequency of push notifications, time of advertisement exposure, etc. The food delivery company can compare the amount of delivery orders made by using the first software application and the amount of delivery orders made by using the second software application to determine whether changing the UI affected the number of orders.

Figure 2:
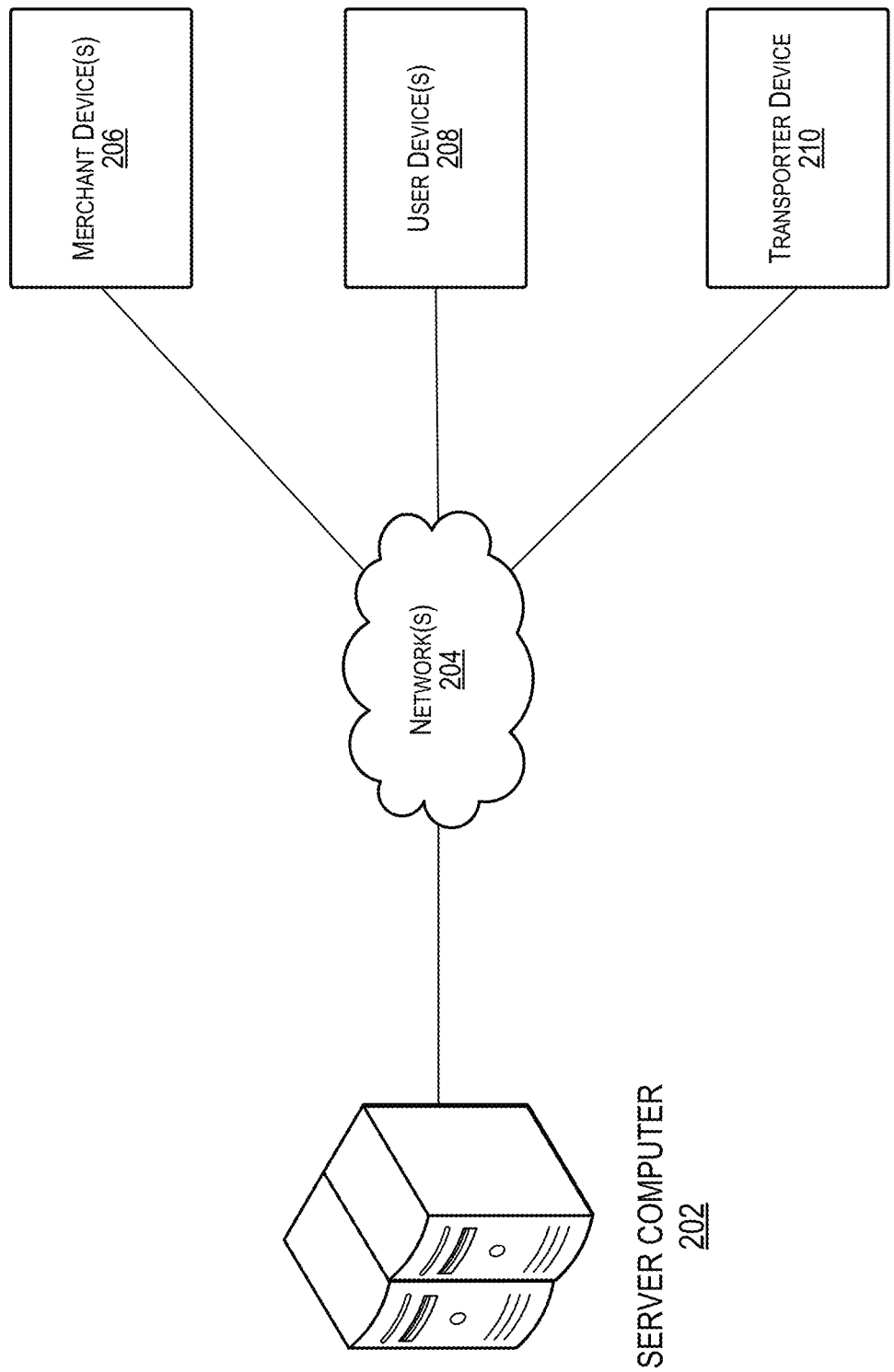
FIG. 2 shows an example distributing computing system of a server computer providing a software application with some functionalities to a plurality of different devices.

FIG. 2 displays an example distributing computing system of a server computer 202 providing a software application with some functionalities to a plurality of different devices through a network 204. Although the plurality of different devices shown in FIG. 2 can comprise a merchant device 206, a user device 208, and a transporter device 210, and the server computer 202, various software versions can run on other devices not shown in FIG. 2. In some embodiments, the server computer 202 can provide the software applications to the plurality of different devices. In other embodiments, server computer 202 can manage communications between the different devices, but the other devices can obtain the software from an app store or other repository, which are examples of other server computers, e.g., when the applications run natively as opposed through a browser.

Some example implementations are described in the environment of the server computer 202 that manages a network of transporters with the transporter devices 210 for delivering items from merchants with the merchant devices 206 to users with the user devices 208. However, implementations herein are not limited to the particular examples provided, and may be extended to other service environments, other system architectures, other types of the plurality of different devices, and so forth.

In the illustrated example, a service provider can operate a server computer 202 to provide delivery services on resources (e.g., food, items, etc.) from merchants (e.g., restaurants, cafes, etc.) to users through transporters (e.g., drivers, bikers, etc.). To facilitate the delivery services, the server computer 202 can provide a software application to different clients belonging to a plurality of categories. For example, different categories can correspond to different merchants, with one or more clients for each category. As examples, the number of categories can be at least 1,000, 5,000, 10,000, 50,000, 100,000, 500,000, or one million. A performance metric can be measured for each category.

A user with the user device 208 can use the software application to make an order (e.g., resource) to a merchant. The order is transmitted to the server computer 202. The server computer 202 can then notify the merchant of the order through the software application through the merchant device 206. The merchant using the merchant device 206 can prepare the order and when ready, can use the software application to alert the server computer 202 that the order is ready. The server computer 202 can then notify a transporter of the readied order and provide delivery instruction to the transporter using the software application. The transporter using the transporter device 210 can use the software application notify the server computer 202 that the delivery is made. The transporter device can additionally provide the server computer 202 with delivery information such as estimated time, location, etc., in which the server computer 202 can provide the delivery information to the user device 208 using the software application.

Figure 3:
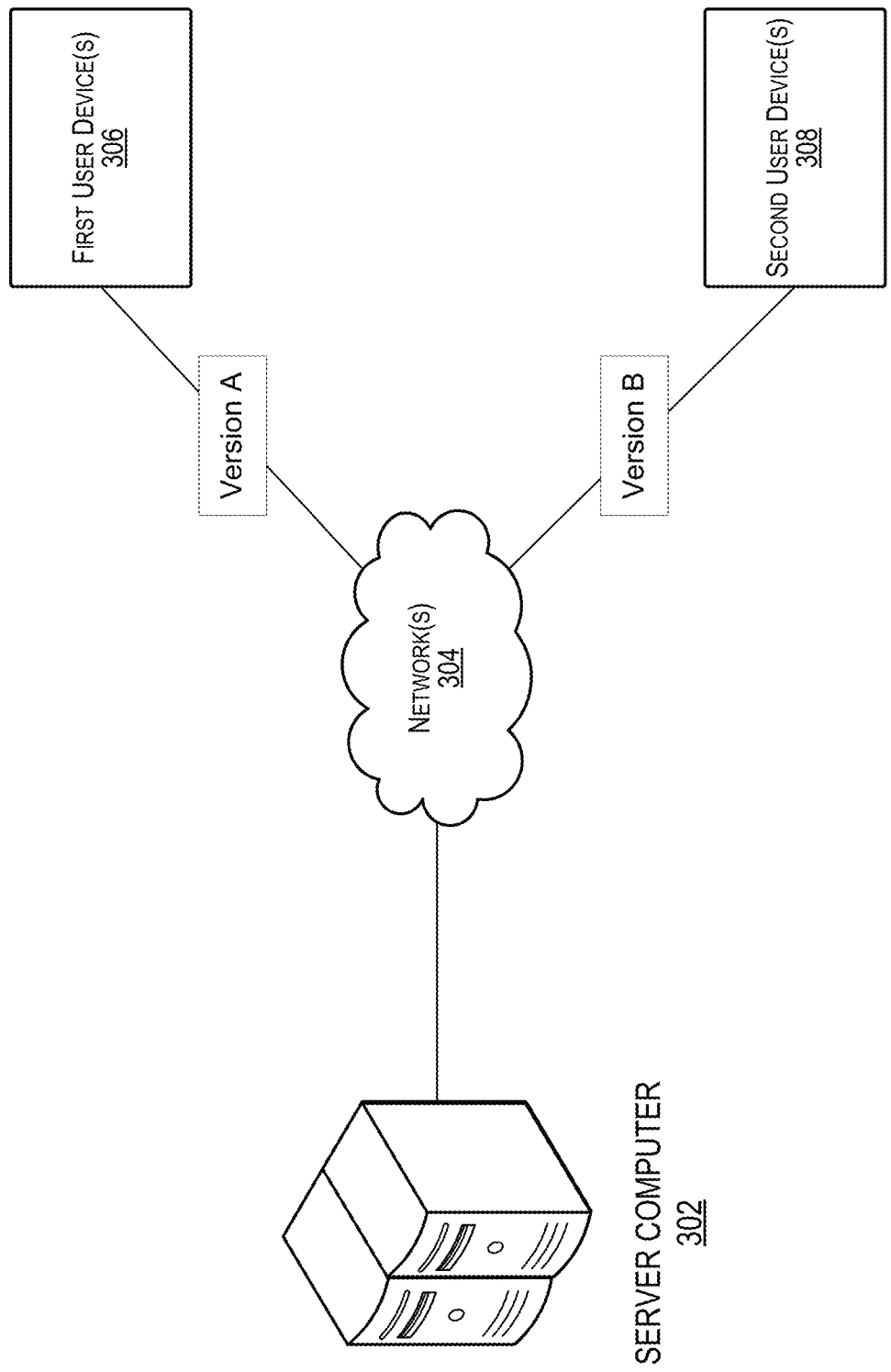
FIG. 3 shows an example distributing computing system of a server computer providing different versions of a software application to user devices to perform an experimental analysis.

FIG. 3 displays an example distributing computing system of a server computer 302 providing different versions of a software application to user devices to perform an experimental analysis. The server computer 302 can provide a first version (denoted as version A in FIG. 3) having a first option for a particular functionality of the software application to a first user device 306 and a second version (denoted as version B in FIG. 3) having a second option for the particular functionality to a second user device 308 through a network 304. In some embodiments, the experimental analysis can be performed among other devices not displayed in FIG. 3. For example, the first version can be sent to a merchant device (not in FIG. 3) and the second version can be sent to another merchant device Some example implementations are described in the environment of the server computer 302 that manages different user devices to perform an experimental analysis on different versions of software applications. However, implementations herein are not limited to the particular examples provided, and may be extended to other service environments, other system architectures, other types of the plurality of different devices, and so forth.

In the illustrated example, a service provider can operate the server computer 302 to provide services to a plurality of user devices including the first user device 306 and the second user device 308. To facilitate the services provided by the service provider, the server computer 302 can provide a software application to the plurality of user devices. However, the service provider may have developed a different version of the software application that can perform the same or similar functionality in a different way (or provide completely new functionality) and may want to determine which version of the software application leads to better experimental outcome.

To test which version of the software application is better, the service provider can perform A/B testing between different versions of the software application. The server computer 302 can provide a first version (listed as version A) of a software application having a first option for a particular functionality to the first user device 306 while providing a second version (listed as version B) of a software application having a second option for the particular functionality to the second user device 308 and compare experimental outcomes. The first option can be when a treatment variable (e.g., UI) is not applied while the second option can be when the treatment variable is applied. For example, a food delivery company can perform an A/B testing on a first software application having an old UI to perform delivery related functionalities and a second software application having a new UI to perform the same delivery related functionalities. The food delivery company can compare the amount of delivery orders (i.e., experiment outcome) made by using the first software application and the amount of delivery orders made by using the second software application to determine whether changing the UI affected the number of orders.

III. Variance Reduction Methods

Experiment outcomes (e.g., as measured by a metric) of both the first software application and the second software application can be often very noisy, with high level of variance. This may be due to experiment outcomes depending on numerous other factors besides a treatment variable. For example, the number of delivery orders made by a customer can be dependent on time, weather, place, etc. not related to change in UI. Such high level of variance can lower the statistical significance of the treatment variable in the experiment outcome, i.e., lowering experimental power. To mitigate such issue, variance reduction methods can be used to reduce variance in experimental metrics.

Figure 4A:
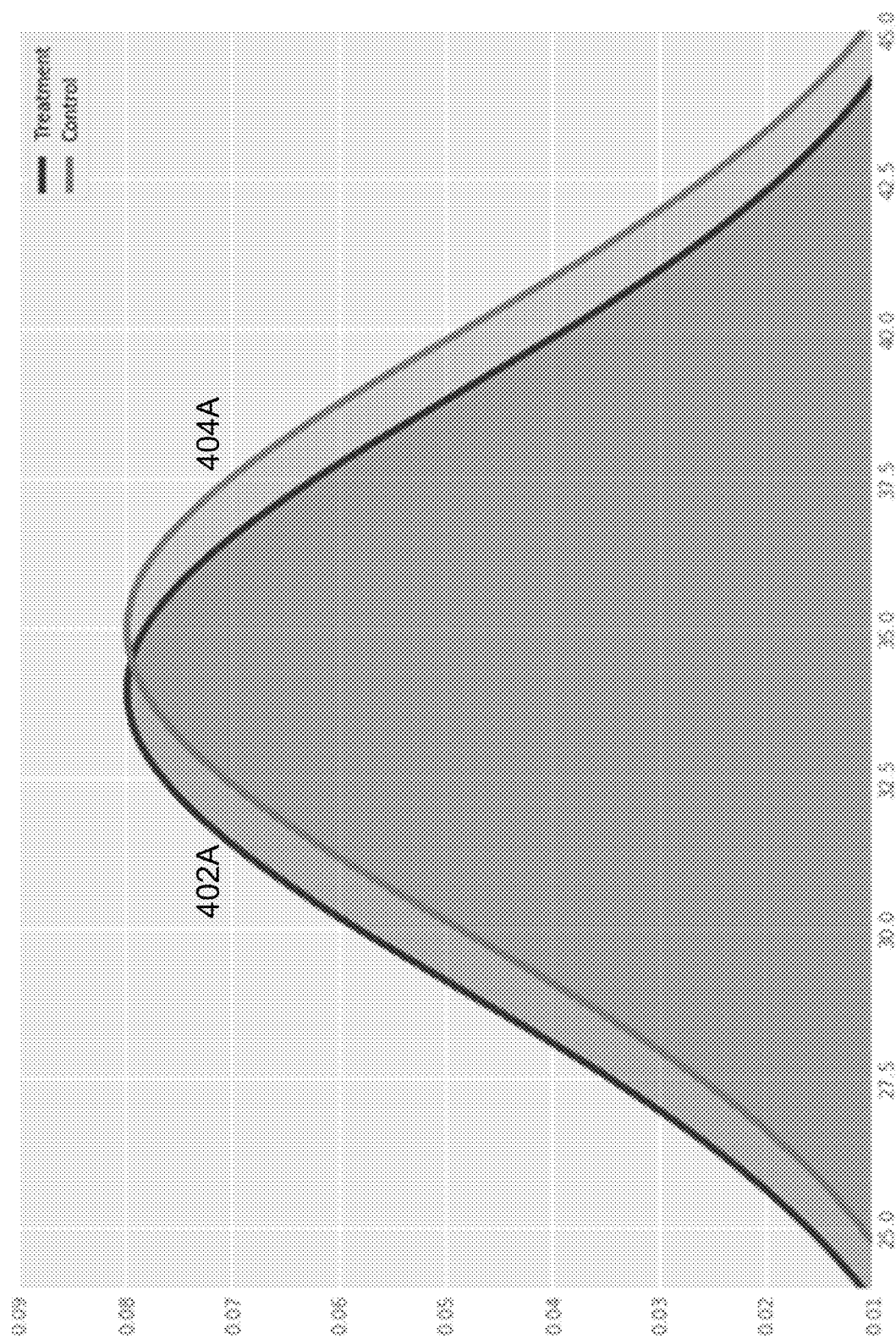
FIG. 4A shows a normal distribution of a treatment group and a normal distribution of a control group with a high level of variance.
Figure 4B:
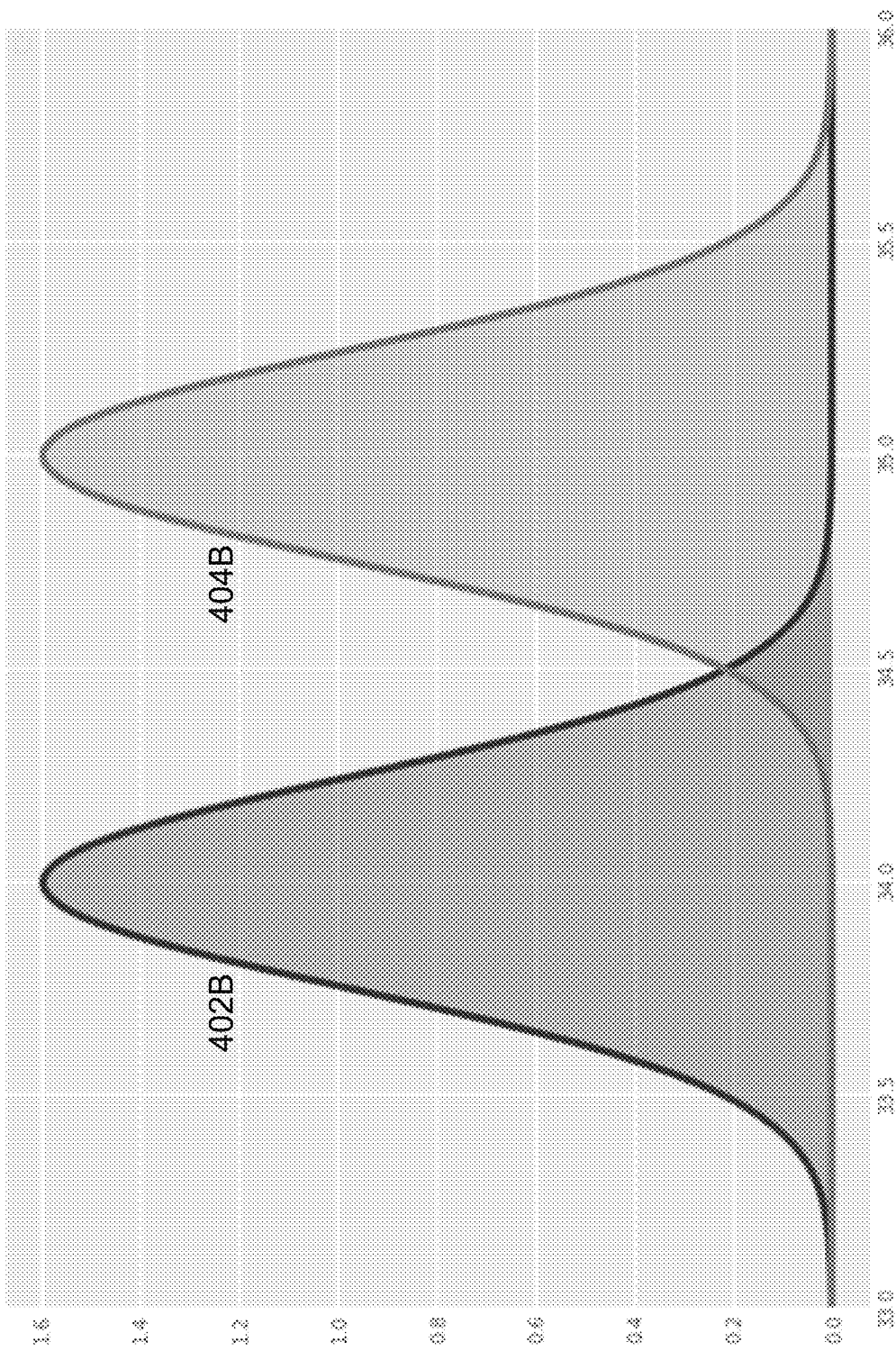
FIG. 4B shows a normal distribution of a treatment group and a normal distribution of a control group with a low level of variance.

FIGS. 4A and 4B illustrate a control distribution (e.g., experiment outcome of a control group) and a treatment distribution (i.e., a normal distribution of a treatment group) of experiment outcomes. The control distribution can be the experiment outcome of a first version of a software application while the treatment distribution can be the experiment outcome of a second version of the software application.

FIG. 4A displays the treatment distribution and control distribution of an experiment outcome with a high level of variance. FIG. 4B displays treatment distribution and control distribution of an experiment outcome with a lower level of variance.

In FIG. 4A, a treatment distribution 402A and a control distribution 404A are displayed. Although the mean in the treatment distribution 402A is different than the mean of the control distribution 404A, there is a substantial overlap between the treatment distribution 402A and the control distribution 404A. Such overlap can make it difficult to detect whether a treatment variable is statically significant. Therefore, a high level of variance can decrease the statistical significance of the treatment variable to the outcome (i.e., lower experimental power). Thus, it can be difficult to determine which version of the software is better, e.g., leads to faster delivery times.

In FIG. 4B, a treatment distribution 402B and a control distribution 404B are displayed. The variance among the treatment distribution 402B and the treatment distribution 404B are reduced significantly compared to the distributions in FIG. 4A. Due to lower variance, there is only a little overlap between the treatment distribution 402B and the control distribution 404B. Such little overlap can make it easy to detect whether a treatment variable associated with a new version is statically significant and better. Therefore, a low level of variance can increase the statistical significance of the treatment variable to the outcome (i.e., higher experimental power).

For example, a food delivery company can perform an A/B testing on a first software application having an old UI to perform delivery related functionalities and a second software application having a new UI to perform the same delivery related functionalities. The control distribution 404B can reflect the delivery time using the old UI, and the treatment distribution 402B can reflect the delivery time using the new UI. From FIG. 4B, it is clear that the treatment distribution 402B has shorter delivery time than the control distribution 404B. In such case, the food delivery company can determine that the new UI is better and can deploy the second software application having the new UI to its clients (e.g., users of the food delivery company, merchants, etc.).

A. Control Using Pre-Experiment Data

One method of variance reduction can reduce variance by using pre-experiment outcome in a single instance. In some embodiments, control using pre-experiment data can use an average of different instances of pre-experiment outcome over a time period to account for variance within a target metric (e.g., measurement of experimental outcome). Since the pre-experiment outcome is collected before the treatment variable is applied, the pre-experiment outcome is independent of the target metric and the treatment variable. Therefore, the pre-experiment outcome can help explain variance in the target metric not affected by the treatment variable (i.e., noise). Control using pre-experiment data uses this idea by having the pre-experiment outcome as a covariate to reduce the variance of the target metric to determine an auxiliary metric.

In some embodiments, the pre-experiment outcomes can be used to reduce variance in the target metric by determining a coefficient for the pre-experiment data to use on the target metric. The auxiliary metric can be $Y_{CUPED}=Y_1-\theta*(Y_0-\overline{Y_0})$, where $Y_1$ is the target metric, $Y_0$ is the pre-experiment outcome, $\overline{Y_0}$ is average of the pre-experiment outcome, $\theta$ is a coefficient, and $Y_{CUPED}$ is the auxiliary metric. The coefficient $\theta$ can be computed by determining the equation of $$\frac{Cov(Y_1, Y_0)}{Var(Y_0)},$$

where $Cov(Y_1, Y_0)$ is a covariance between the target metric and the pre-experiment outcome, and $Var(Y_0)$ is the variance of the pre-experiment outcome. The derivation of the equation and the coefficient is described later.

As an illustrative example of control using pre-experiment data, consider an A/B experiment of a delivery company testing whether a new version of a software application (i.e., treatment variable) increases number of orders. An exemplary data table can be seen in Table 1.

TABLE 1

| Person | New Version | Orders0 | Orders1 |
|---|---|---|---|
| 1 | 0 | 5 | 8 |
| 2 | 1 | 2 | 7 |
| 3 | 0 | 4 | 9 |
| 4 | 0 | 5 | 8 |
| 5 | 0 | 5 | 8 |

Orders0 column can be the pre-experiment outcome of number of orders generated by each person before the experiment outcome is collected (e.g., before new version of a software application is introduced). The experiment can then start, and the treatment variable can be applied. Orders1 column can be experiment outcome of orders generated using a new version of a software application (New Version=1) and not using a new version of a software application (New Version=0). Once the pre-experiment outcome and the experiment outcome are measured, then the pre-experiment outcome can be used to reduce variance in the target metric (experiment outcome) by performing a linear regression on the target metric. The linear regression can be expressed as $Y_{CUPED}=Y_1-\theta*(Y_0-\overline{Y_0})$, where $Y_1$ can be Revenue1 column, $Y_0$ is Revenue0 column, and $Y_{CUPED}$ is an auxiliary metric for revenue. The coefficient $\theta$ can be computed by performing a mathematical equation of $$\frac{Cov(Y_1, Y_0)}{Var(Y_0)},$$

where $Cov(Y_1, Y_0)$ is a covariance between Revenue1 column and Revenue0 column, and $Var(Y_0)$ is the variance of the Revenue0 column. The auxiliary metric $Y_{CUPED}$ should then have a smaller variance than the target metric $Y_1$.

B. Using Complex Machine Learning Models

Another method of variance reduction can use an output of a complex machine learning model as a covariate to reduce the variance of the target metric. Control using predictions as covariate technique can build the output of the machine learning model by using observation-level features (e.g., feature selection) of the pre-experiment outcome. Control using predictions as covariate can aim to generate a machine learning model where its output (i.e., covariate) maximizes the correlation with the target metric, as higher correlation between the covariate and the target metric can mean more variance in the target metric can be explained by the covariate.

In control using predictions as covariate, the pre-experiment outcome can be used to build a machine learning model that uses the observation-level features of the pre-experiment outcome to generate an output that maximizes the correlation to the target metric. The control using predictions as covariate can still retain the same linear regression as control using pre-experiment data. The mathematical equation of control using predictions as covariate can be $Y_{CUPAC}=Y_1-\theta*(Y_0-\overline{Y_0})$, where $Y_1$ is the target metric, $Y_0$ is the output of the machine learning model, $\overline{Y_0}$ is an average of the output of the machine learning model, $\theta$ is a coefficient, and $Y_{CUPED}$ is the auxiliary metric. The $\theta$ can be computed by performing a mathematical equation of $$\frac{Cov(Y_1, Y_0)}{Var(Y_0)},$$

where $Cov(Y_1, Y_0)$ is a covariance between the target metric and the output of the machine learning model, and $Var(Y_0)$ is the variance of the output of the machine learning model.

IV. Control Using Forecasts as Covariate (CUFAC)

Current variance reduction techniques have several flaws. The control using pre-experiment data technique does not account for a time-series trend (e.g., evolving pattern over time). The control using pre-experiment data technique captures pre-experiment outcome at a single instance, or an average of pre-experiment outcome at multiple instances, which does not account for evolving pattern over time. For example, when a delivery company performs an experimental analysis of whether a new UI in its application (treatment variable) increases the number of users (experiment outcome), the delivery company may use control using pre-experiment data technique to reduce variance. However, if there is a trend of increase in amount of delivery orders per customer (e.g., time series trend), the control using pre-experiment data technique would not be able to capture such trend, as control using pre-experiment data cannot project based on the trend but only use pre-experiment data which may be significantly lower than the target metric.

Control using predictions as covariate method uses a machine learning model based off of pre-experiment data to generate outcome that maximizes correlation with a target metric (e.g., experiment outcome), but such method usually requires heavy effort to adopt and maintain due to the sophisticated feature engineering process (e.g., train a model, make predictions about the future. code up these features, etc.). The control using predictions as covariate method can take a long time (e.g., two weeks) to generate a suitable machine learning model that can generate output that maximizes that correlation to the target metric. Additionally, because the control using predictions as covariate method takes up so much resource and time, it also is not compatible for a model with multiple covariates.

Aforementioned problems with current variance reduction methods can be solved by using a control using forecasts as covariate (CUFAC) method. The CUFAC method can use time series modeling to solve experiment metric variance reduction problems. The time series model can generate forecasts using the directional drift (trend, including seasonal) from a current level. Then certain maps (ratio, quantile, etc.) can be developed to project the drift to the granular experiment unit level and obtain the metric forecasts to be used as covariates. In other words, maps can be used to tailor a general model to be more accurate for a specific entity (e.g., for a particular category, such as a merchant). For example, if the average delivery time is the output at a current level, then certain maps can be applied to average delivery time to determine average delivery time per merchant, average delivery time per store, etc. The method of forecasting and developing maps are further described later.

By using the time series modeling, CUFAC can capture time-series trend, or evolving pattern over time (unlike control using pre-experiment data) and does not have to go through heavy feature engineering process (such as one used in CUPAC). A forecast metric can be determined by using the time series model and can be used as a covariate to reduce variance from the target metric. The time series model can be rapidly trained (via using historical pre-experiment data) and make the forecast metric widely available in a generalized way. Being able to project drift to the granular experiment unit level is a huge advantage especially compared to CUPAC. For example, if there are 1000 average delivery times of merchants that are being used as covariates, then CUPAC would need to individually build a machine learning model to build an optimal output ($Y_0$) to be used as a covariate (which can take up to two weeks per covariate), as opposed to CUFAC, which only needs to build a single time series model of average delivery time and use maps to determine average delivery time at granular unit (e.g., per merchant).

CUFAC technique can use the forecast metric as a covariate to reduce the variance in the target metric to generate an auxiliary metric. CUFAC technique can subtract the optimal output (e.g., of an individual/element) by an average of the optimal outputs (e.g., of plurality of individuals/elements) to determine a value. CUFAC technique can then subtract the value from the target metric to determine the auxiliary metric. The mathematical equation of CUFAC can be $Y_{CUFAC}=Y_1-\theta*(Y_0-\overline{Y_0})$, where $Y_1$ is the target metric, $Y_0$ is the forecast metric, $\overline{Y_0}$ is an average of the forecast metric, $\theta$ is a coefficient, and $Y_{CUFAC}$ is the auxiliary metric. The forecast metric $Y_0$ can be subtracted by the average of the forecast metric $\overline{Y_0}$ to keep the mean of the auxiliary metric $Y_{CUFAC}$ constant while reducing only the variance. In some embodiments, the auxiliary metric can be determined by subtracting the forecast output from the target metric in cases when means may not be considered (e.g., when finding a treatment effect between a control group and a treatment group). The mathematical equation of CUFAC for such case can be $Y_{CUFAC}=Y_1-\theta*Y_0$. The $\theta$ can be computed by performing a mathematical equation of $$\frac{Cov(Y_1, Y_0)}{Var(Y_0)},$$

where $Cov(Y_1, Y_0)$ is a covariance between the target metric and the forecast metric, and $Var(Y_0)$ is the variance of the forecast metric.

A. Forecasting

Forecasting can be a technique of predicting the future based on the results of historical data (i.e., pre-experiment data). Forecasting can predict the future by determining a pattern (e.g., through regression using various functions, such as polynomials, exponential, periodic functions, such as sines and cosines, etc.) of the historical data and applying to future time values. Good forecasting can determine accurate predictions even with existence of volatile changes in the historical data. Forecasting can be helpful for planning and operations, especially those where success is heavily indexed on operational efficiency. For example, retail companies can rely on forecasting to ensure that supply meets demand across volatile changes in seasonal preferences and consumer demand. Another example can be manufacturers can use forecasting to ensure that they have the right number of supplies and inventory to fulfill orders without locking up money in idle or unused resources.

Forecasting has several characteristics. One characteristic can be that forecasting can benchmark current course and speed based on the historical data (e.g., time series trend). For example, a user can be provided with predictions on what the future outcome will be based on the current course and speed. Another characteristic can be that forecasting can enable users with scenario planning. For example, a user can manipulate some parts of historical data to predict how the outcome will change, even using some hypothetical data. Yet another characteristic can be granular decision-making. For example, if future outcome is predicted, then certain maps (ratio, quantile, etc.) can be developed to project the drift to the granular experiment unit level.

Figure 5:
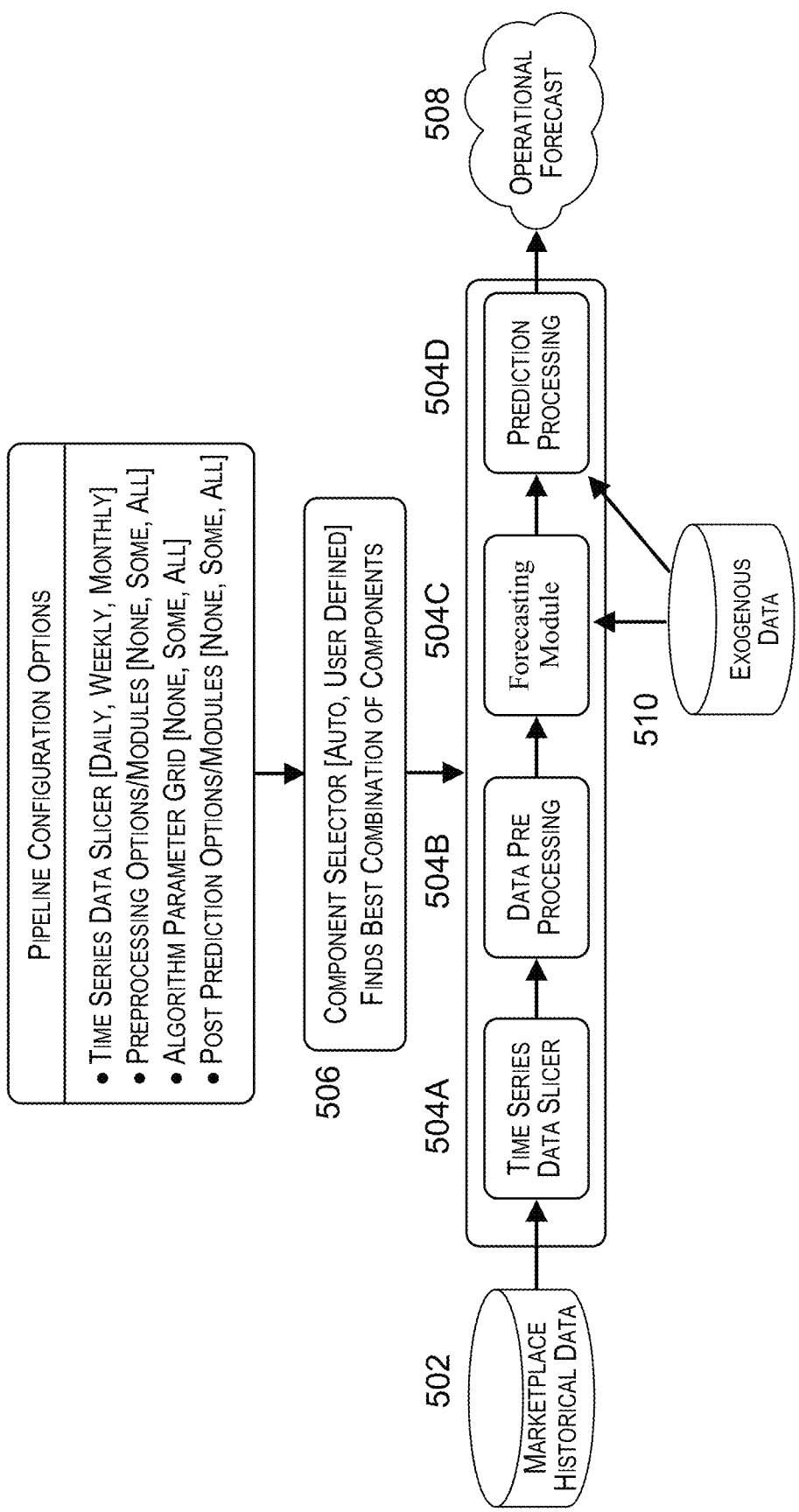
FIG. 5 shows a block diagram of generating forecasts using a time series model.

FIG. 5 shows a block diagram of using a time series model 504 to make forecasts 508. A historical data 502 can be inputs to the time series model 504 to generate the forecasts 508. The time series model 504 can comprise a time series data slicer module 504A, a data preprocessing module 504B, a forecasting module 504C, and a prediction processing module 504D. A component selector 506 and an exogenous data 510 can be in operative communication with the time series model 504 when generating the forecasts 508. The exogenous data 510 can be any data that could have an impact on the forecasts 508 (e.g., weather, holidays, etc. can be exogenous data for forecasts on number of orders). The forecasts 508 can be used as a covariate that can reduce variance of the actual experiment outcome (target metric) in CUFAC.

The historical data 502 can be used as inputs to the time series model 504. The historical data 502 can be pre-experiment data. In some embodiments, historical data 502 may set a minimum amount of pre-experiment data to make forecasts 508. For example, the time series model may request at least 28 days of weather data to generate weather forecasts. The historical data can be a set of first values of a performance metric of the clients using the first version of a software application. The first version of the software application can have a first option for a particular functionality of the software application. The set of first value can be measured over a first time period (e.g., at least 28 days). Clients can belong to a plurality of categories. For example, each category can represent individual merchant. The historical data 502 can be sent to the time series model 504, and be processed by the time series data slicer module 504A. The set of first values can include at least 1000 values.

As an illustrative example of a performance metric, consider a number of orders per merchant for a food delivery company. An exemplary data table Table 2 can be seen below. Each category can be an individual merchant (location or all locations) represented in the merchant column. The first time period can be a period of time when users made a first order (orders0) and a second order (orders1). A second time period can be a period of time for current orders (i.e. experimental outcome) or future orders and is listed in the third order (orders2). The new version can indicate whether a specific user used a first version (New Version=0) of a software or a second version (New Version=1) of a software when determining order during the second time period. Although only 5 users are shown in the performance metric, it can range up to thousands.

TABLE 2

| Merchant | New Version | Orders0 | Orders1 | Orders2 |
|---|---|---|---|---|
| 1 | 0 | 2 | 5 | 8 |
| 2 | 1 | 4 | 2 | 7 |
| 3 | 0 | 8 | 4 | 9 |
| 4 | 0 | 7 | 5 | 8 |
| 5 | 0 | 6 | 5 | 8 |

The time series data slicer module 504A can transform historical data (i.e., the set of first values of the performance metrics of the clients into different time units, horizons, frequencies, and optimization periods. This can enable matching forecast characteristics according to different objectives. Different forecast characteristics can result in different forecasts. For example, forecasts generated on the historical data 502 from the last 10 days time frame with an increased trend can look completely different than forecasts generated on the historical data from the last 30 days 502 that optimizes with a general decreased trend (e.g. sharply decreasing from the last 30th day then slightly increasing from the last 10th day) 502. The time units can be hourly, daily, weekly, etc., the horizons can be number of units ahead for predictions, the frequencies can be refresh schedule, and the optimization periods can be a time frame for accuracy in units that training optimizes for. A horizon can be the length of period in which the forecasts are made. For example, when generating forecasts for 4 days in the future, 4 days would be horizon. An optimization period can be the pattern/trend for which the forecasts are to weight more than others. For example, if the optimization period focuses on a trend with positive slope, then forecasts would have a positive slope. Upon transforming the historical data 502, the time series data slicer module 504A can transmit the transformed data into the data preprocessing module 504B.

The data preprocessing module 504B can perform adjustments to the transformed historical data after the time series data slicer module 504A based on accuracy. The data preprocessing module 504B can remove the effects of outliers and other events that can deviate from current course and speed of the time series model 504. The current course and speed can function as an important interface to control for such effects in time series model 504, and can later be added as features in the forecasting module 504C when determining forecasts. In some embodiments the data preprocessing module 504B can include models built on the residuals of the time series model to provide a further bridge for using external features to estimate and control for difficult to specify effects. These external features can be data collected during holidays and promotions that deviate from the current course and speed. For example, data collected during holidays (e.g., external data) may deviate from course and speed of the data collected as a whole. Instead of treating these data as outliers and removing them, the data preprocessing module 504B can add some values (e.g., providing bridge) to these data to be more consistent with the trend. The external features can be derived from the exogenous data 510. The data preprocessing module 504B can transmit the adjusted data to the forecasting module 504C.

Accordingly, data preprocessing module 504B can perform adjustments to the historical data (e.g., set of first values) to determine adjusted historical data. Forecasting module 504C can determine a predicted value using the adjusted and transformed historical data.

The forecasting module 504C can use the historical data 502 that is transformed using the time series data slicer module 504A and adjusted using the data preprocessing module 504B. The forecasting module 504C can be a time series model that can determine forecasts based on the data received from the data preprocessing module 504B. In some embodiments, the forecasting module 504C may use the historical data 502 directly, or only the transformed historical data 502 after the time series data slicer module 504A. The time series model can be a polynomial equation that best fits (e.g., via least squares regression) the data provided to the forecasting module 504C. For example, the time series model may determine the polynomial equation to be a quintic function $ax^5+b \cdot x^4+c \cdot x^3+dx^2+ex+f$, where x is the time and coefficients a, b, c, d, e. and f are determined by the time series model that best fits the data. The forecasting module 504C can then input a current or future time period, or a span of time, to provide forecasts using the time series model. Other forecasting module 504C can comprise other time series equations such as exponential smoothing (ES), autoregressive (AR), autoregressive integrated moving average (ARIMA), seasonal autoregressive integrated moving average (SARIMA), sinusoidal functions, etc. By using time series model techniques that best fits the data, the forecasts can account for a temporal behavior of the data. Once the forecasts are made, the forecasting module 504C can send the forecasts to the prediction processing module 504D.

The prediction processing module 504D can perform necessary adjustments on the forecasts. The prediction processing module 504D can remove the effects of outliers and other events of the forecasts that can deviate from current course and speed. The prediction processing module 504D can further perform adjustments similar to the data preprocessing module 504B. In some embodiments, residual adjustments can be made on difficult to specify effects. The prediction processing module 504D can then output final forecasts 508. The final forecasts can be predicted value of the performance metric during a second time period. The second time period can be a period of time for collecting experimental outcome. An illustration of the second time period can be shown in the illustrated example of the historical data 502. The second time period is a current or future time period Besides the modules in time series model 504, the component selector 506 can help refine the time series model 504. The component selector 506 can allow a user to specify which components and parameters to backtest over a given time window to the improve the accuracy of the forecasting module 504C.

The backtest can be used as a term to test a time series model on historical data to see how accurate the time series model is. For example, if the historical data 502 has data from year 2012 to 2014, the backtest can use the time series model 504 to generate forecasts for year 2014 based on the data from years 2012 to 2013. Since the data for year 2014 is available, the forecasts for the year 2014 and the data for the year 2014 can then be compared, and the time series model 504 can adjust its forecasting module 504C based on the result.

Different combinations of data preprocessing module 504B, lookback windows of limiting input data range (e.g., using range of years 2012 to 2013 to generate forecasts for 2014), and prediction processing module 504D can be specified along with internal model-specific parameters (e.g., additive and multiplicative seasonality) to improve the accuracy of the forecasting module 504C during the backtest by providing the best parameters (e.g., coefficients for the polynomial equation) and adjustments (e.g., shortening the input time series during periods of rapid change or dismissing holiday adjustments made during data preprocessing).

Figure 6:
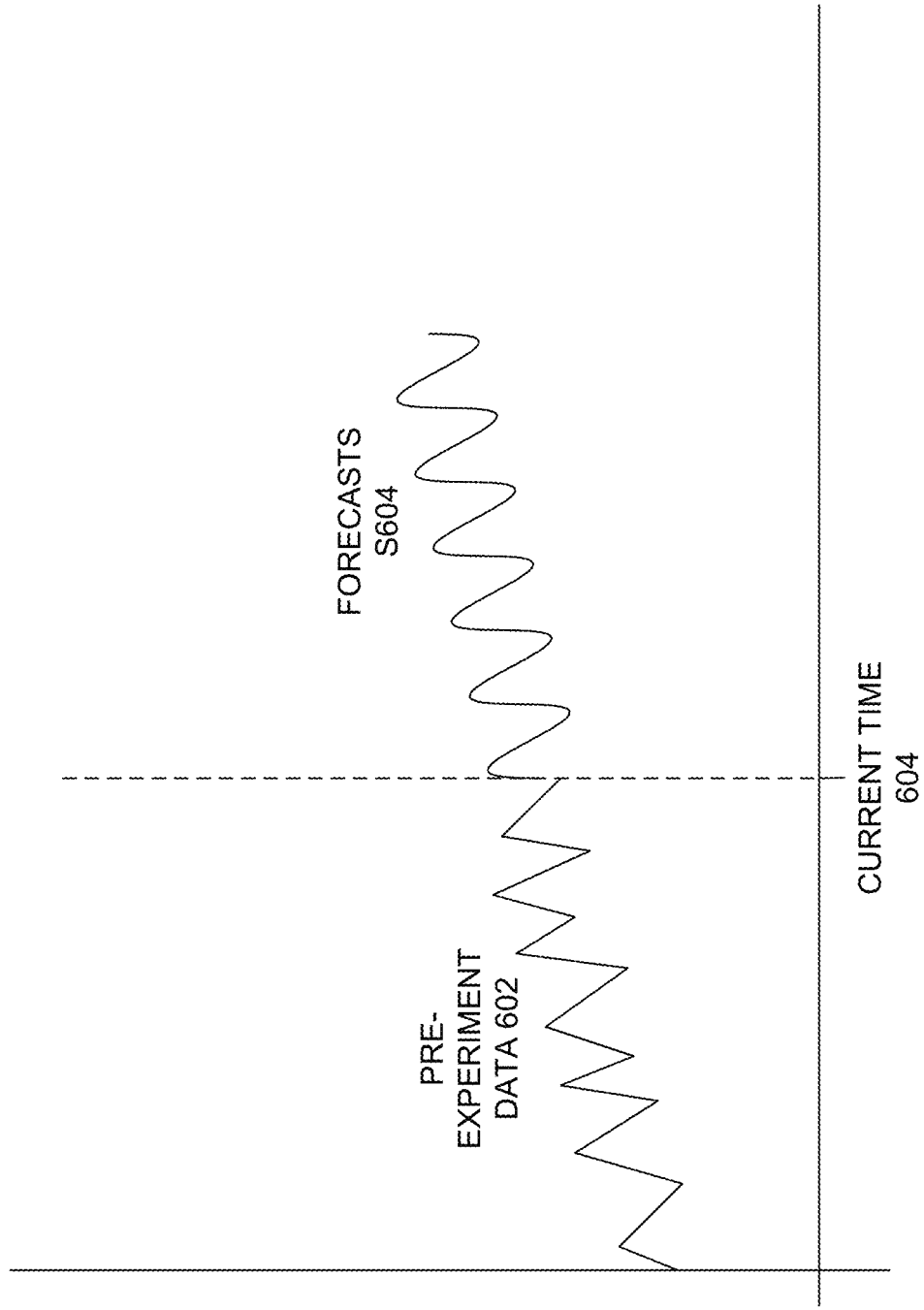
FIG. 6 shows an example plot of determining forecasts based on pre-experiment data.

As an illustrative example, consider FIG. 6. FIG. 6 displays forecasts generated by using a time series model on pre-experiment data 602 to generate forecasts. Although the modules aren't demonstrated in FIG. 6, the pre-experiment data may perform data slicing and preprocessing before generating a time series equation that best fit according to the pre-experiment data 602. In FIG. 6, the time series model may select periodic functions (e.g., sinusoidal functions) to determine forecasts S604. The time series model may select periodic function to use based on the pattern observed in the pre-experiment data. For example, the pre-experiment data 602 can have ups and downs in the graph, with an overall trend/slope of the data being in an upward trajectory. Therefore, observing this pattern, the time series can select the periodic function to generate forecasts. Although not shown in FIG. 6, the forecasts S604 may also go through prediction processing to eliminate any potential outliers.

A server computer can store performance metric comprising pre-experiment data (i.e., first values) and experiment outcome (i.e., second values) of a software application. The pre-experiment data can be a set of first values of the performance metric collected by the server computer using the first version (e.g., historical data 502) of a software application for each of the plurality of categories. The set of first values can be collected during the first time period (e.g., pre-experiment period). The first version of the software application can have a first option for a particular functionality of the software application. The experiment outcome can be data collected during an experimental analysis (e.g., A/B testing) where a treatment variable is introduced for a second version (e.g., newer version). For example, a treatment variable can be a UI change, the first version can be UI before the change and the second version can be UI after the change. The experiment outcome can be second value collected for both the first version and the second version of the software application during a second time period (e.g., experiment period) for each of the plurality of categories. For example, the experiment outcome can be number of orders, and the experiment outcome for the first version can be number of orders before the UI change in the software application and the second version can be number of orders after the UI change in the software application.

Since the experiment outcome often has high variance, the server computer can use the pre-experiment data to determine predicted value of the performance metric during the second time period using the time series model (FIG. 4), and use the predicted value to the experiment outcome of the performance metric to reduce the variance within the experiment outcome to generate auxiliary metric (as shown in CUFAC equation). The server computer can then use the auxiliary metric to accurately determine which version of the software application led to better experiment outcome by comparing the second version of the software application into the first version of the software application for each of the plurality of categories.

B. Mapping

A time series model can be used to forecast the directional move (drift) of experiment metrics at the group level (e.g., submarket, district, customer cohort, business id etc.). The group level can be clients that belong to a plurality of categories. Then certain maps (ratio, quantile etc.) that project the drift to the unit level (e.g., customer or merchant) can be used to obtain the metric forecasts for each client. In other words, maps can be used to tailor a general model to be more accurate for a specific entity (e.g., for a particular category, such as an individual merchant). For example, if a forecast of average delivery time in San Francisco is made using the time series model, then certain maps can be applied to determine different categories such as average delivery time per food type (e.g., desert, dinner, etc.) in San Francisco, average delivery time per store in San Francisco, etc.

One way to map group level forecasts to get unit level forecasts is through ratio mapping. The group level forecasts can be multiplied by certain ratios to determine unit level forecasts. Each unit can have a unique ratio. For example, when a computer is trying to determine a conversion rate of a customer, the computer can determine pre-experiment data of the conversion rate of a customer $u_{pre}$, and of the conversion rate of the group (e.g., district, submarket, etc.) that the customer is in $G_{pre}$. Then the computer can determine a ratio of $u_{pre}/G_{pre}$. The computer can input the pre-experiment data of the conversion rate of the group to the forecasting model to determine forecasts of the conversion rate at the group level $G_{forecast}$, and multiply the $G_{forecast}$ by the ratio $u_{pre}/G_{pre}$ to determine forecasts at the unit level $u_{forecast}$. Each unit can have a different ratio value depending on the conversion rate $u_{pre}$. For example, one customer can have a different conversion rate $u^1_{pre}$ than another customer $u^2_{pre}$.

Another way to map group level forecasts to get unit level forecasts is through quantile mapping.

Figure 7:
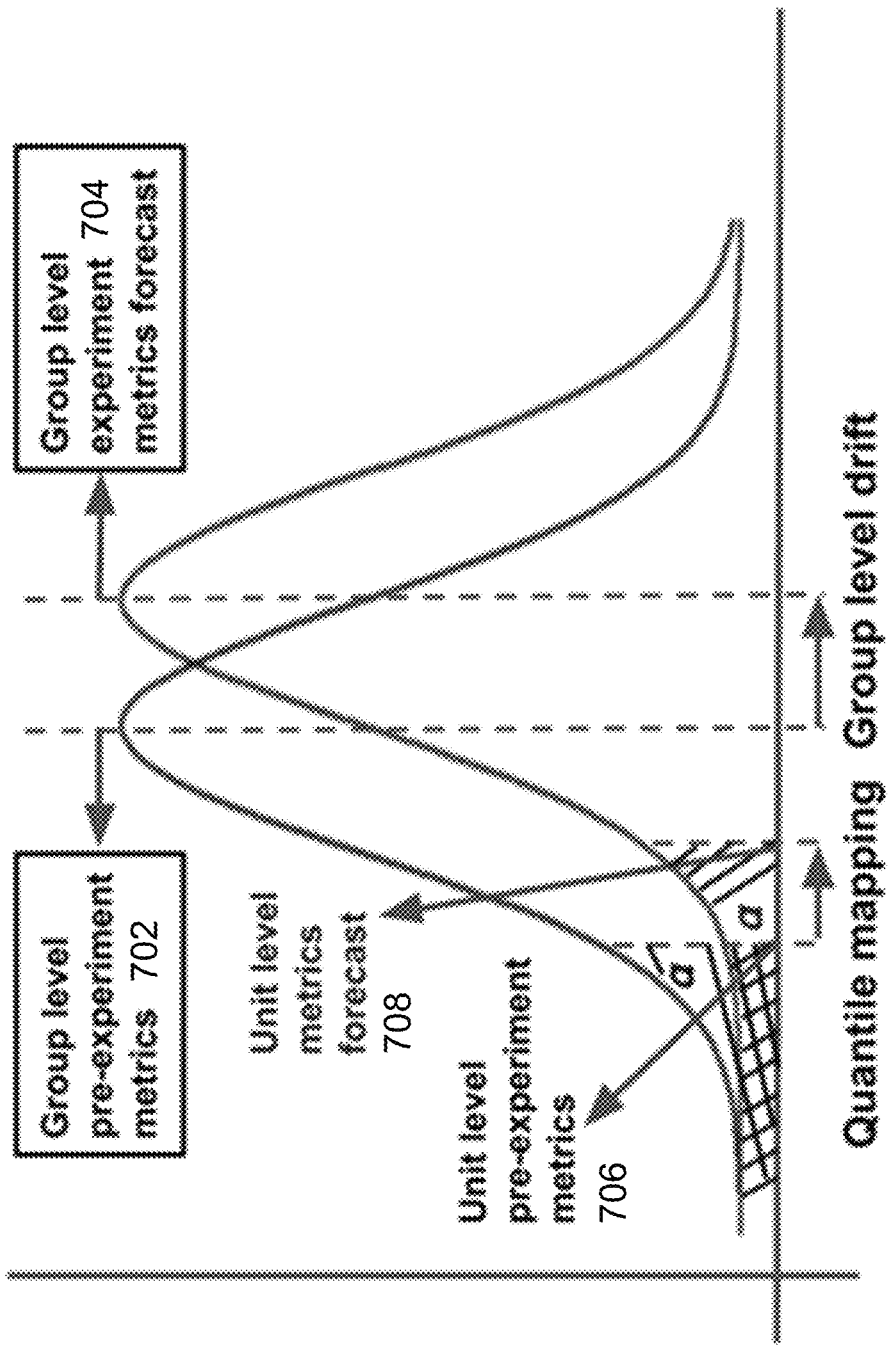
FIG. 7 shows normal distributions illustrating quantile mapping of group level forecasts.

FIG. 7 shows two distributions, one being a pre-experiment metric and another being a forecast metric. Although FIG. 7 shows the two distributions as normal distributions, they can be other distributions such as exponential, gamma, beta, etc. A cumulative distribution function (cdf) of a pre-experiment unit level 706 can be determined from a pre-experiment distribution 702. Then the forecast unit level 708 can be determined using the cdf of a pre-experiment unit level in a group experiment forecast distribution 704. In the distribution plot, each point in the distribution can represent conversion rate of a customer.

For example, when a computer is trying to determine a conversion rate of a customer, the computer can determine pre-experiment data of the conversion rate of a customer $u_{pre}$. FIG. 7 can illustrate pre-experiment data over a single period of time. Horizontal axis can represent a conversion rate, and Y can represent a probability density of that conversion rate. The computer may also determine conversion rates of customers in a group (e.g., district, submarket, etc.) including the conversion rate of a customer $u_{pre}$. Using the conversion rates of customers in the group, the computer can create a group level distribution $G_{pre}$. Each point in the group level distribution $G_{pre}$ can represent an average of the conversion rate of a customer over the single period of time. The computer can then determine a cdf of the conversion rate of the customer $u_{pre}$ using the group level distribution. Upon determining the cdf, the computer can input the group level distribution of the pre-experiment data $G_{pre}$ to the forecasting model to determine group level distribution of the forecasts $G_{forecast}$. The computer can then use the group level distribution of the forecasts $G_{forecast}$ and the cdf from the pre-experiment data to determine the conversion rate of forecasted customer $u_{forecast}$.

C. Methods

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The CUFAC variance reduction method may be carried out using the aspect method disclosed in greater detail with reference to FIG. 8.

Figure 8:
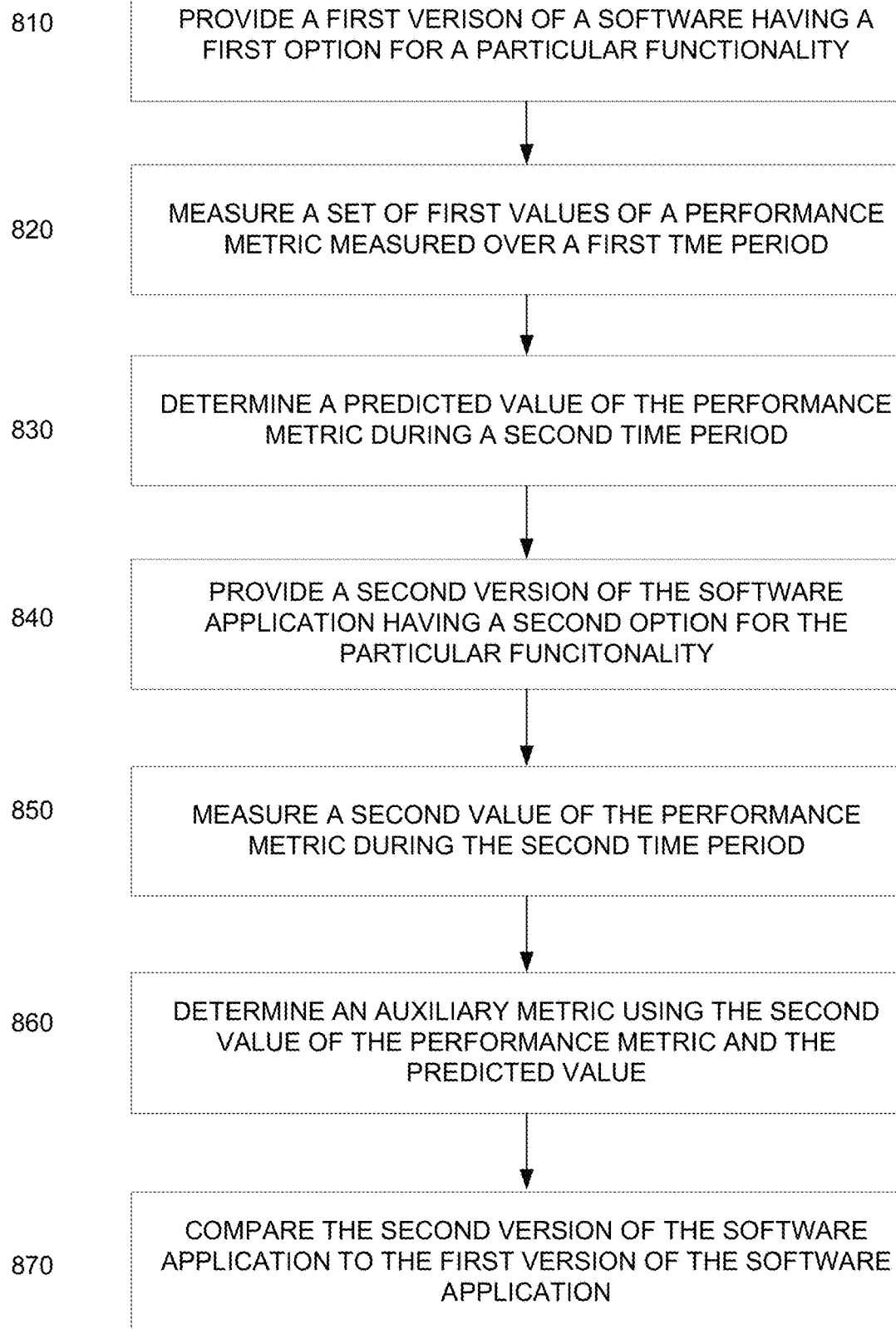
FIG. 8 shows a flow diagram corresponding to using forecasts to reduce variance of an experimental outcome.

FIG. 8 is a flow chart illustrating a method 800 for using a CUFAC method to reduce variance within a target metric. The method 800 can be performed by an example server computer 302 in FIG. 3. The server computer can provide a first version of a software application and a second version of a software application to identify which version has better experimental outcome. The method 800 can also be used by other computers, individuals, group of individuals, etc. and implementations herein are not limited to the particular examples provided.

In block 810, a server computer can provide the first version of a software application having a first option for a particular functionality of the software application. For example, a server computer can provide a software application with a user interface (i.e., first option) that provides easy access (i.e., particular functionality) to different functionalities of the software application. The server computer can provide the first version of the software application to clients that belong to a plurality of categories. Each category in the plurality of categories can be a different service provider for a service within the software application For example, a client can correspond to a merchant, with each category representing each service provider (e.g., a merchant) that are in a geographical area.

In block 820, the server computer can measure a set of first values of a performance metric of the clients using the software application measured over a first time period. The first time period can be time period when pre-experiment data is collected and before the actual experimental analysis (e.g., A/B testing). The set of first values can be pre-experiment data collected before measuring experiment outcome. The server computer can collect the set of first values for just one category of the plurality of categories. For example, a delivery service provider operating a server computer that want to identify if changing UI of its software application leads to increase in number of orders can collect a set of first values for a user device that make orders. In some embodiments, the server computer can collect the set of first values for more than one category of the plurality of categories. For example, a delivery service provider operating a server computer that want to identify if changing UI of its software application leads to decrease in total time of delivery may need to collect a set of first values for each user device in a plurality of user devices.

In block 830, the server computer can determine a predicted value of the performance metric during a second time period. The second time period can be time period when experiment outcome is collected. The predicted value can be determined based on the set of first values of the performance metric during the first time period. This can be illustrated in FIG. 4 where a time series model takes in pre-experiment metric to generate predicted value (i.e., forecasts). The pre-experiment metric may be sliced to different intervals of time, horizons, frequencies, and optimization periods. The pre-experiment metric may then be pre-processed to eliminate outliers and be fitted into a time series equation that best fits the data (e.g., via least squares regression) to generate predicted value (i.e., forecasts), where the predicted value is then processed to eliminate outliers that are generated. The predicted value may account for temporal behavior of the set of first values of the performance metric. The predicted value can be determined for one or more of the plurality of categories depending on the experiment outcome.

In block 840, the server computer may have developed a second version of the software application having a second option for the particular functionality of the software application. Thus, the second version is different for the particular functionality. In some implementations, the second version can perform the same functionality as the first version but with a different option. For example, the second version can differ from the first version by having a different user interface (UI).

The server computer may want to determine which version of the software application can result in better experiment outcome. Accordingly, the server computer can provide the second version of the software application having a second option for the particular functionality. The server computer can provide the second version of the software application to clients that belong to a plurality of categories. For example, in FIG. 1, a server computer provided a software application to merchant device, user device, and transporter device. In some embodiments, the server computer can provide the second version of the software application to different clients than the first version. For example, in FIG. 2, the server computer gives the first software application to a first user device while giving the second software application to a second user device.

In block 850, the server computer can measure a second value of the performance metric during the second time period. The second value of the performance metric can be experiment outcome measured for both the first version of the software application and the second version of the software application. Similar to block 820, the server computer can collect the set of second values for one or more categories of the plurality of depending on whether the experiment outcome is related to just one category or more than one of the plurality of categories.

In block 860, the server computer can determine an auxiliary metric using the second values of the performance metric and the predicted value. The auxiliary metric can be determined by using a CUFAC equation $Y_{CUFAC}=Y_1-\theta^*(Y_0-\overline{Y_0})$, where $Y_1$ is the second values of the performance metric, $Y_0$ is the predicted value, $\overline{Y_0}$ is an average of the predicted values, $\theta$ is a coefficient, and $Y_{CUFAC}$ is the auxiliary metric. The $\theta$ can be computed by performing a mathematical equation of $$\frac{\text{Cov}(Y_1, Y_0)}{\text{Var}(Y_0)},$$

where $\text{Cov}(Y_1, Y_0)$ is a covariance between the target metric and the forecast metric, and $\text{Var}(Y_0)$ is the variance of the forecast metric.

In block 870, the server computer can compare the second version of the software application to the first version of the software application using the auxiliary metric. The server computer can compare the two versions to determine which version of the software application leads to better experiment outcome. For example, if a delivery service provider is trying to determine whether changing UI leads to increase in number of orders, the delivery service provider can compare number of orders for a first version (before the UI change) and a second version (after the UI change) to determine whether second version led to increase in number of orders. Upon making the comparison, the server computer can decide which version of the software application is better. Depending on the experiment outcome, the server computer can compare auxiliary metric for one or more of the plurality of categories.

V. Automation Pipeline

Forecasts from FIG. 5 can be used as a covariate to reduce variance in the target metric. The mathematical equation of CUFAC can be $Y_{CUFAC}=Y_1-\theta^*(Y_0-\overline{Y_0})$, where $Y_1$ is the target metric (e.g., data measured during actual experiment), $Y_0$ can be the forecast metric generated by using the time series model of FIG. 5, $\overline{Y_0}$ is an average of the forecast metric, and $Y_{CUFAC}$ is the auxiliary metric.

However, the forecasts generated by using the forecast model of FIG. 4 have several problems. One problem is that during the data preprocessing/postprocessing, adjustments outside of the automated trend are done manually. For example, adjustments to outliers and external effects are generally manually accounted for by a user using the time series model. Another problem occurs when adjustments made in each of the module of the time series model is not tracked. For example, the effects of preprocessing/processing modules may not be tracked when generating forecasts using the time series model. Any changes made are overwritten on top of the baseline forecasts. Additionally, there does not exist any segregation of information regarding each step of the process, as any changes are overwritten on top of the baseline forecasts. In order to solve these problems, an automation pipeline (i.e., forecast factory) can be built. The automation pipeline can automatically generate adjustments that were supposedly done manually when building forecasts. Additionally, the automation pipeline can track and organize different adjustments.

A. Flow Diagram

Figure 9:
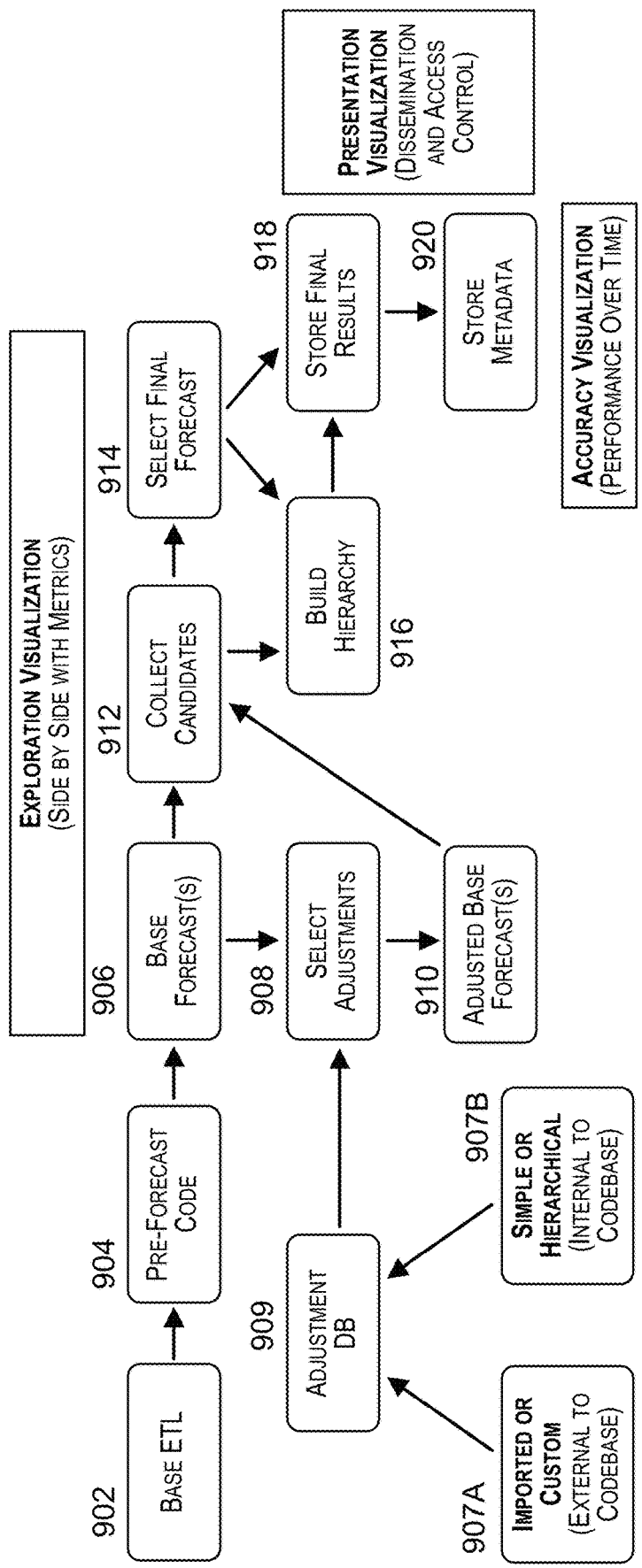
FIG. 9 shows a block diagram of using an automation pipeline to generate forecasts.

FIG. 9 shows a flow diagram of using an automation pipeline to generate forecasts. A base ETL (extract, transform, load) module 902, a pre-forecast code module 904, a base forecast module 906, a select adjustments module 908, an adjusted base forecast module 910, a collect candidates module 912, a select final forecast module 914, a build hierarchy module 916, store final results module 918, and store metadata module 920 can be in operative communication to use the input series to generate the forecasts. An imported or custom module 907A and a simple or hierarchical module 907B can be used to determine an adjustment DB module 909 that provide adjustments to forecasts built after using the base forecasts module 906.

In the base ETL module 902, a user can supply the automation pipeline with the input series for forecasting. The input series can be pre-experiment data in which the automation pipeline can base its forecasts from. The pre-experiment data can comprise a set of first values of a performance metric of clients using a first version of a software. The first version of the software application can have a first option for a particular functionality of the software application. The set of first values can be measured over a first time period (e.g., at least 28 days). Clients can belong to a plurality of categories. For example, each category can represent individual merchant. The plurality of categories can include at least 100 categories. The set of first values can include at least 1000 values.

In the pre-forecast code module 904, any pre-forecasts steps can be performed during this module. The pre-forecasts steps can include transforming input series (i.e., the set of first values) first into different time units, horizons, frequencies, and optimization periods similar to the time series data slicer module 504A of FIG. 5. The pre-forecasts steps can also include making necessary adjustments to the input series. Making necessary adjustments can include removing effects of outliers that deviate from current course and speed of the model and building a residual predictor that can be used as a bridge to be consistent with the course of the model for preprocessing external features (e.g., holidays, promotions, etc.) similar to the data preprocessing module 504B of FIG. 5. There can be other necessary pre-forecasts steps that might be adjusted for the input series before using the time series model (i.e., forecast model) to determine forecasts. The adjustments made in the pre-forecast code module 904 can be done automatically to transform the input series (i.e., the set of first values) into time series data. The pre-forecast code can be performed for each category of the plurality of categories. The time series data can be sent to the base forecast module 906.

In the base forecast module 906, a time series model can determine at least one base forecast value for a second time period (i.e., experiment period) using the time series data received by the pre-forecast code module 904. In some embodiments, the base forecast module 906 can use the input series directly from the base ETL module 902. The time series model can be a polynomial equation that best fits the time series data given to the base forecast module 906. For example, the time series model may determine the polynomial equation to be a quintic function $ax^5+b \cdot x^4+c \cdot x^3+dx^2+ex+f$, where x is the time and coefficients a, b, c, d, e, and f are determined by the time series model that best fits the time series data. Other time series model can comprise other time series equations such as exponential smoothing (ES), autoregressive (AR), autoregressive integrated moving average (ARIMA), seasonal autoregressive integrated moving average (SARIMA), etc. This can be similar to the forecasting module 404C of FIG. 4. The base forecast value can be generated for each of the plurality of categories.

The base forecast module 906 can generate one or more base forecast models including base forecast values according to a first set of parameters. The first set of parameters can be a set of parameters (e.g., time series model, optimization period, etc.) the automation pipeline (e.g., machine) think are the best to determine forecasts. For example, one kind of base forecast values can be generated with all the external effects nor outlier effects accounted for. Another kind of base forecast values can be generated that optimizes (e.g., putting a heavier focus) on the last 10-day time frame. Among several different forecasts generated by the base forecast module 906, the system can select the best forecast values. One way the base forecast module 906 to select the best forecasts is through making probability estimates as to which forecasts has the highest correlation to past data. There can be other ways to determine the best forecasts.

The automation pipeline can present with the user one or more base forecast models including base forecasts values. If the user sees the one or more base forecast models including base forecast values selected by the machine is not the best and disagrees with the system, then the user can select which adjustments to make in the select adjustments module 908. The user can make this assessment based on its own domain knowledge (e.g., some external events) that the base forecast module 906 does not have. For example, the user may know next week is Christmas week, and the Christmas week will have impact on forecasts for number of delivery orders. The user can input an adjusted set of parameters that show which adjustments to make to the forecasts (e.g., predictions) or the input series (e.g., historical data) according to the user's domain knowledge to the automation pipeline. For example, the user may increase the forecasts for number of delivery orders as people tend to increase the number of delivery orders during Christmas. The adjusted set of parameters can be stored in the adjustment DB module 909. In some embodiments, the adjustment DB module 909 can be supplied by imported or custom module 907A or a simple or hierarchical module 907B. These can be different design choices of which forecast model different adjustments to make to the forecasts. For example, the imported or custom module 907A can be adjustments made to each submarket of the input series while the simple or hierarchical module 907B can be adjustments made at the general market level. The select adjustments module 908 can obtain the adjusted set of parameters from the adjustment DB module 909 and provide the adjustments to the adjusted base forecast module 910. This can result in a quick way to adjust forecasts dynamically for business knowledge (e.g. an outage in the previous week or an upcoming promotion that are not able to easily be captured as feature).

In the adjusted base forecast module 910, the user can apply the adjusted set of parameters from the select adjustments module 908 to the base forecasts generated by the base forecast module 906. In some embodiments, the adjustments selected by the user may require the adjusted base forecast module 910 to run adjusted forecast model on the time series data according to the adjusted set of parameters. The adjusted forecast model can generate adjusted forecast values using the time series data from the user. The user can then choose the adjusted forecast values and send the adjusted forecast values to the collect candidates module 912.

In the collect candidates module 912, a plurality of forecast models with forecast values can be stored in a database with a schema that attaches metadata (e.g., internal and external parameters selected for preprocessing). The metadata can be different settings for model training. Examples of the internal parameters could be additive/multiplicative trend, seasonality, error assumptions, etc. Examples of the external parameters can be different types of pre/post processors (e.g., holiday, weather, promotion, etc.). The collect candidate module 912 can additionally display visualizations of a plurality of forecast models including the adjusted forecast model in a user interface. The visualizations can also display forecast values for each of the plurality of forecast models. The visualizations can include graphs and a suite of metrics (e.g., external parameters). The visualizations can also comprise history of different changes made by the user (e.g., adjusted parameters). The visualizations can help the user examine how each model generates the forecasts, and compare the forecasting performance between different candidate models.

In select final forecast module 914, the user can select a forecast model among the plurality of forecast models, and the user can lock the forecast model as final. Upon the user selecting the final forecast model, any metadata of the forecast can be stored in the database as the metadata of the final forecast in store metadata module 920.

In some embodiments, the plurality of forecast models can have a hierarchy. The hierarchy can be a structure to combine different forecast values to generate a new forecast value. For example, when needing to map certain forecasts into a granular unit, the build hierarchy module 916 can obtain a ratio/quantile mapping that can map forecast values into a granular unit. The build hierarchy module 916 can the apply the ratio into the forecast values to generate new forecast values at a granular unit. This can include mapping weekly forecasts into daily forecasts using a day to week ratio, delivery orders in states to cities in the states using state to city ratio, etc.

Similar to FIG. 5, CUFAC technique can use the forecast metric generated in FIG. 9 as a covariate to reduce the variance in the target metric to generate an auxiliary metric. The mathematical equation of CUFAC can be $Y_{CUFAC}=Y_1-\theta*(Y_0-\overline{Y_0})$, where $Y_1$ is the target metric, $Y_0$ is the forecast metric, $\overline{Y_0}$ is an average of the forecast metric, $\theta$ is a coefficient, and $Y_{CUFAC}$ is the auxiliary metric. The $\theta$ can be computed by performing a mathematical equation of $$\frac{Cov(Y_1, Y_0)}{Var(Y_0)},$$

where $Cov(Y_1, Y_0)$ is a covariance between the target metric and the forecast metric, and $Var(Y_0)$ is the variance of the forecast metric. Further, in some embodiments, when obtaining forecasts at granular experiment unit level, mapping technique described in FIG. 7 can be applied to forecasts generated in the automation pipeline. The server computer can use the auxiliary metric to accurately determine which version of the software application led to better auxiliary metric to accurately determine which version of the software application led to better experiment outcome by comparing a second version (e.g., experiment data) of the software application into the first version of the software application for each of the plurality of categories.

B. Methods

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The automation pipeline method may be carried out using the aspect method disclosed in greater detail with reference to FIGS. 10A and 10B.

Figure 10A:
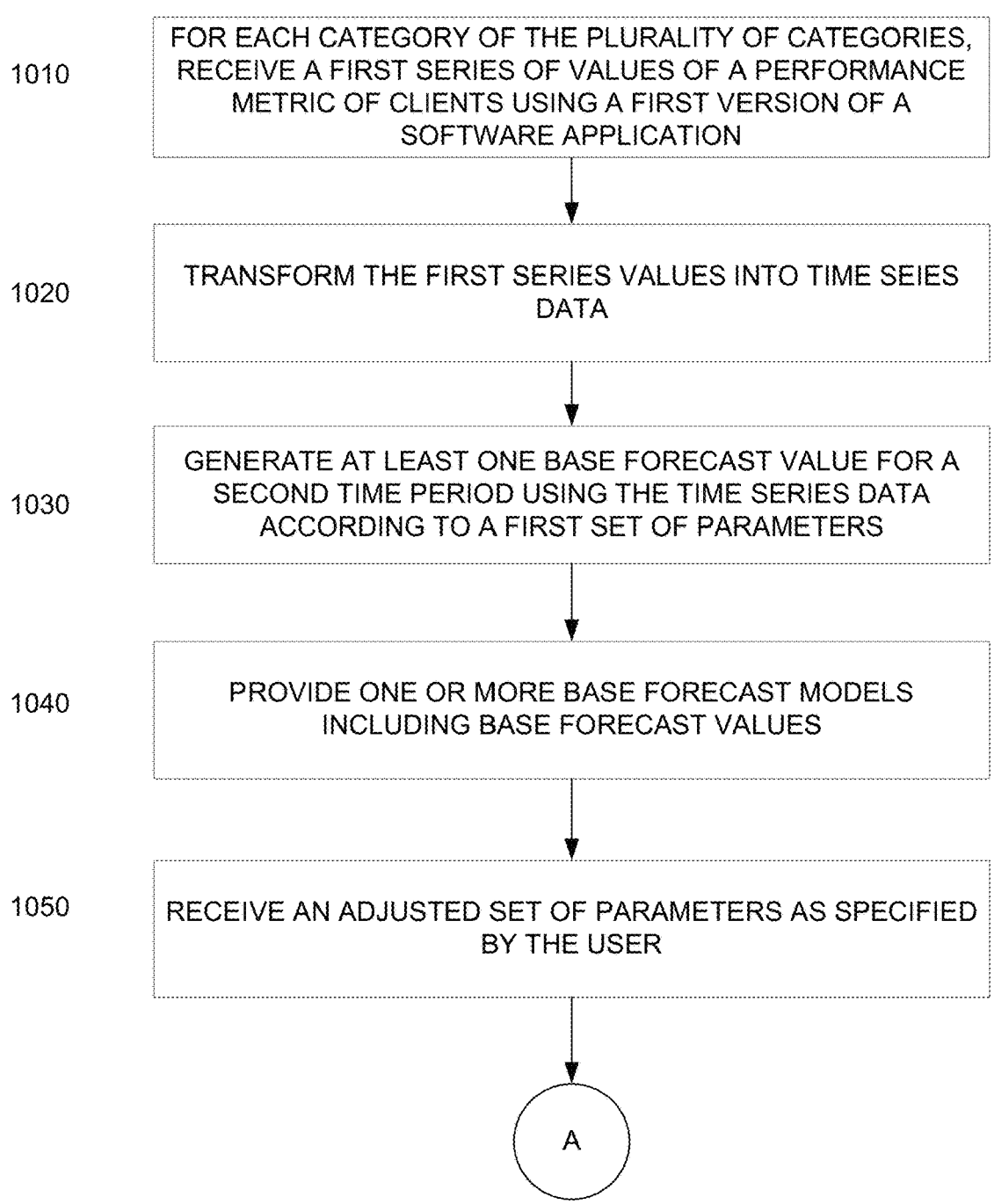
FIGS. 10A and 10B shows flow diagrams of using an automation pipeline to generate forecasts.
Figure 10B:
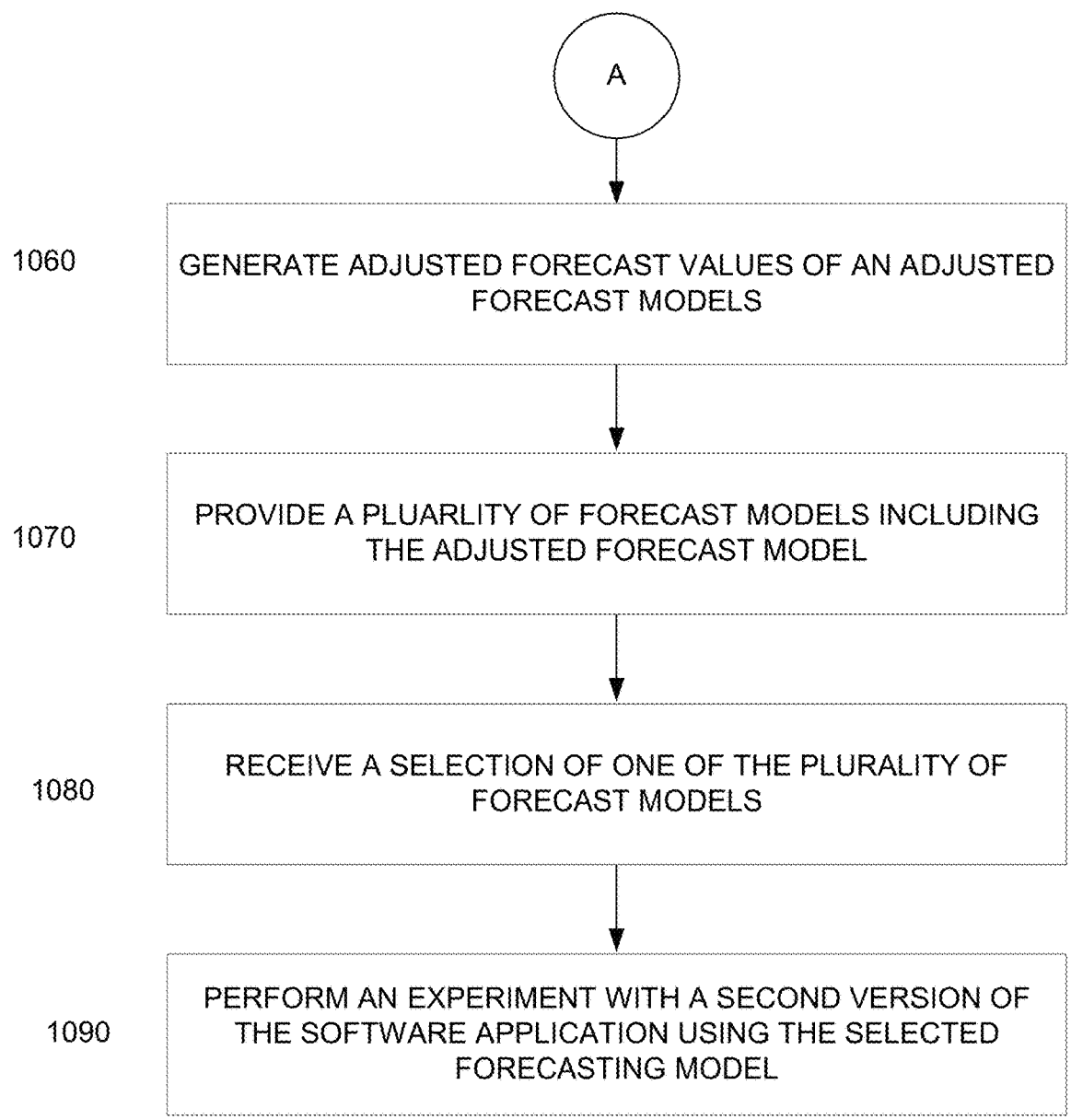

FIGS. 10A and 10B are flow charts illustrating a method for using an automation pipeline to determine forecasts. The method can be performed by an example server computer 302 in FIG. 3. The method can also be used by other computers, individuals, group of individuals, etc. and implementations herein are not limited to the particular examples provided.

In block 1010, a server computer can receive a set of first values of a performance metric of clients using a first version of a software application. The set of first values can be measured at various times over a first time period. The first time period can be time period when pre-experiment data is collected and before the actual experimental analysis (e.g., A/B testing). The set of first values can be pre-experiment data collected before measuring experiment outcome. The clients of the software application can belong to a plurality of categories. For example, a client can correspond to a merchant, with each category representing each merchant, e.g., in a geographical area. In some embodiments, the server computer can collect the set of first values for each category of the plurality of categories. Th plurality of categories can include at least 100 categories, and the set of first values can include at least 1000 values.

In block 1020, the server computer can transform the set of first values (e.g., input series) for a category into a time series data using a pre-forecast module. The pre-forecasts module can include transforming the input series into different time units, horizons, frequencies, and optimization periods to match forecast characteristics according to a first set of parameters. The pre-forecast module can also adjust the input series to remove the effects of outliers and adding external features on data in the input series that deviate from course and speed of the input series. The transformed and adjusted input series (e.g., time series data) can then be used by the server computer to generate base forecasts.

In block 1030, the server computer can generate at least one base forecast value for a second time period using the time series data. The second time period can be time period when experiment outcome is collected. The server computer can generate the time series data by using a time series model. The time series model can be a polynomial equation, exponential smoothing (ES), autoregressive (AR), autoregressive imegrated moving average (ARIMA), seasonal autoregressive integrated moving average (SARIMA), etc. that can be used to best fit the data. The time series data is inputted into the time series model to determine at least one base forecast value for a second time period using the time series data. The server computer can generate different forecasts values for a second time period with different forecast characteristics according to the first set of parameters. The blocks 1020 and 1030 can be repeated for each of the plurality of categories.

In block 1040, the server computer can provide to a user one or more base forecast models including base forecast values. Each base forecast model can have different forecast characteristics. In some embodiments, the server computer can select the best base forecast value among base forecast values, and display a base forecast model with the best forecast value to the user. The user can decide to proceed with the base forecast model determined by the server computer, or may adjust set of parameters to determined different base forecast model and base forecast value.

In block 1050, the user may decide to adjust parameters to determine different base forecast model and base forecast value. The server computer can receive an adjusted set of parameters as specified by the user. The adjusted set of parameters may be different than the first set of parameters. The adjusted set of parameters can include different time units, horizons, frequencies, and optimization periods. The adjusted set of parameters can be obtained from an adjustment DB module.

In block 1060, the server computer can generate adjusted forecast values of an adjusted forecast model for the plurality of categories for the second time period using the time series data according to the adjusted set of parameters. Similar to block 1030, the server computer can generate the adjusted forecast values using a time series model. The time series data can be adjusted accordingly, and the adjusted time series data can be inputted into the time series model to determine adjusted forecast values.

In block 1070, the server computer can provide a plurality of forecast models including the adjusted forecast model to a user. The server computer can provide other base forecast models generated in block 1030 to the user. The user may have visualizations of the plurality of forecast models, and may determine which forecast model/forecast value is the best. The visualizations can have different statistics that can help the user determine the best forecast model.

In block 1080, the server computer can receive a selection among the plurality of forecast models. The selection can be made by the user. The selection may be different than the best forecast model predicted by the server computer, the adjusted forecast model, or both. The forecast value of the selected forecast model can then be used in an experiment.

In block 1090, the server computer can perform an experiment with a second version of the software application using the selected forecast model, the experiment including measuring second values for the performance metric for each of the plurality of categories of the clients during the second time period. The experiment performed by the server computer can be using adjusted forecast value to reduce variance of a target metric, similar to the experiment described in FIG. 8

VI. Multiple Control Variates

Forecasts can be used as a single covariate that can reduce variance in a target metric (e.g., experimental outcome). Mathematically, this can be represented as $Y=Y_1-\theta*(Y_0-\overline{Y_0})$, where $Y_1$ is the target metric, $Y_0$ is the forecast metric, $\overline{Y_0}$ is an average of the forecast metric, and Y is the auxiliary metric. However, in some embodiments, there can be other covariates that can be used to further reduce variance of the target metric. For example, a delivery company performing an experimental analysis of whether a new UI in its application (treatment variable) increases the number of users (experiment outcome), e.g., on a per merchant basis, can use other variables such as time spent on other food delivery company application per user, amount of money spent on the delivery per user, etc. as covariates to reduce variance. Determining multiple covariates can involve using historical data to analyze whether the covariate has a high influence on the variance of the target metric.

Using multiple control variates to reduce variance in a target metric can be similar to a single covariate metric. Mathematically, the multiple control variates can be represented as $Y=Y_1-\theta_a*(Y_a-\overline{Y_a})-\theta_b*(Y_b-\overline{Y_b})-\ldots-\theta_n*(Y_n-\overline{Y_n})$, where $Y_1$ is the target metric, $Y_a$ is a first covariate, $\overline{Y_a}$ is an average of the first covariate, $\theta_a$ is a coefficient of the first covariate, n is the number of covariates, and Y is the auxiliary metric.

In order to compute a coefficient $\theta$ for each covariate in the multiple control variates, it uses an iterative method that applies on a single covariate to solve the coefficient estimate. For example, if there is a multiple control variates of $Y=Y_1-\theta_a*(Y_a-\overline{Y_a})-\theta_b*(Y_b-\overline{Y_b})-\theta_c*(Y_c-\overline{Y_c})$, where $Y_1$ is a target metric and $Y_{a\ldots c}$ are covariates, then there needs to be three rounds of performing a single linear regression of $Y=Y_1-\theta_x*(Y_x-\overline{Y_x})$, where x=a ... c, to determine optimal coefficient estimate $\theta$. If there are 1000 covariates, 1000 single linear regression needs to run iteratively. In some embodiments, $Y_1$ can be an auxiliary metric from previous iteration. For example, if an auxiliary metric $Y_{1,a}$ is determined from $Y_{1,a}=Y_1-\theta_a*Y_a$ in the previous iteration, the auxiliary metric for the current iteration $Y_{1,b}$ can be determined from the auxiliary metric of the previous iteration $(Y_{1,b}=Y_{1,a}-\theta_b*Y_b)$ and so on.

The following method of computing multiple control variates has several limitations. One limitation is that the iterative solution has an efficiency loss compared with the global optimum, as the optimal coefficient estimate $\theta$ for each covariate is determined separately using single linear regression. Another limitation is that the resulting solution depends on the order of solving each covariate coefficient, as the target metric can be replaced with the auxiliary metric from the previous iteration. Yet another limitation is running the iterative algorithm may be time consuming, with having more covariates leading to longer time to estimate each optimal coefficient.

Embodiments can use a closed form solution to determine optimal coefficients of the multiple control variates. As opposed to an iterative solution for each control variate, the solution can estimate multiple optimal coefficients simultaneously. The closed form solution accounts for a global optimum as it does not separate each covariate but estimate all the multiple optimal coefficients simultaneously as a whole. Therefore, there is no dependency on the order of covariate coefficient, and may not be time consuming to make predictions.

A. Single Covariate

A mathematical equation of using a single control variate to reduce variance in a target metric can be derived, which can further help with deriving a mathematical equation of using multiple control variates to reduce variance (which are described later).

In a typical A/B test, a treatment variable is tested to see if it has a desired effect on an output (X). Assuming that data for the whole population is collected (ideal but not achievable), the best way to figure out the effect of the treatment variable would be to compare the control group of the population with the treatment group population. This can be done by determining average treatment effect (ATE). The ATE can involve subtracting the expected value of the treatment group population with the expected value of the control group population:

$$ATE = E[X_{P,T} - X_{P,C}] = E[X_{P,T}] - E[X_{P,C}] = \mu_T - \mu_C$$

$X_{P,T}$ is the treatment group population while $X_{P,C}$ is the control group population.

Since collecting data from the whole population is realistically unachievable, samples of the whole population can be taken to determine the effect of the treatment variable. To determine the effect of the treatment variable for samples, an estimator for average treatment effect (ATE) can be determined. Since sample mean is an unbiased estimator of the population mean (e.g., $E(\overline{X_T})=\mu_T$) the estimator for ATE can be $$ATE_{est} = \overline{X_T} - \overline{X_C}$$

where $\overline{X_T}$ is a sample mean of the treatment group and $\overline{X_C}$ is a sample mean of the control group.

However, depending on the data collected, the ATE estimator may not be statistically significant. For example, in FIG. 4A, the data collected has high variance that decreases statistical significance of the treatment variable. Therefore, to make the ATE estimator statistically significant, a covariate can be used to reduce variance for each group (e.g., control group, treatment group). Consider the output X. A random variable Z which is independent of the output X can be used as a covariate to reduce variance. The following equation using the random variable Z as the covariate can be derived:

$$x_{aux} = \overline{X} + \theta\overline{Z} - \theta E[Z] = \overline{X} + \theta(\overline{Z} - E[Z])$$

Since the expectation of the last two terms $\overline{Z}$ and $E[Z]$ cancel out, the expectation of $X_{aux}$ would still be the same as the expectation of $\overline{X}$. If the random variable Z is a pre-experiment metric, then this becomes CUPED method of using the pre-experiment data to reduce data. If the random variable Z is output of the machine learning model determined from pre-experiment data, then this becomes CUPAC method. If the random variable Z is forecast metric, then this becomes CUFAC method.

Now consider variance of $X_{aux}$.

$$VAR(X_{aux}) = VAR(\overline{X} + \theta\overline{Z} - \theta E[Z]) =$$

$$\frac{VAR(X + \theta Z)}{n} = \frac{VAR(X) + \theta^2 VAR(Z) + 2\theta COV(X, Z)}{n}$$

Taking a partial derivative with respect to θ, we can find out that the variance of $X_{aux}$ is minimized for $$\theta = -\frac{COV(X, Z)}{VAR(Z)}$$

Plugging the θ back in to VAR($X_{aux}$) equation, the equation can be:

$$VAR(X_{aux}) = Var(X) - \frac{COV(X, Z)^2}{Var(Z)} = (1 - p^2(X, Z)) * VAR(X)$$

In other words, when there is a high correlation (p(X, Z)) between the random variable Z and the output X, the variance is minimized. There can be several techniques to increase the correlation between the random variable Z and the output X. One way is to use pre-experiment data (CUPED), another way is to use outputs of machine learning model (CUPAC), and yet another way is to use forecasts (CUFAC).

The estimator for ATE using the random variable Z can also be obtained:

$$ATE_{est} = X_{aux,T} - X_{aux,C} =$$

$$\overline{X_T} - \theta\overline{Z_T} + \theta E[Z] - (\overline{X_C} - \theta\overline{Z_C} + \theta E[Z]) = \overline{X_T} - \theta\overline{Z_T} - (\overline{X_C} - \theta\overline{Z_C})$$

$X_{aux,T}$ can be the estimator of the treatment group and $X_{aux,C}$ is the estimator of the control group.

Additionally, each data element can be adjusted as the following equation.

$$X_{aux,i} = X_i - \theta(Z_i - \overline{Z})$$

Therefore, deriving an auxiliary metric $X_{aux}$ using a single covariate (or random variable Z) can be represented as $Y=Y_1-\theta*(Y_0-\overline{Y_0})$, where Y is the auxiliary metric $X_{aux}$, $Y_1$ is a target metric (experiment outcome) X, and $Y_0$ is the random variable Z.

B. Multiple Covariates

Embodiments can derive a mathematical equation of using multiple covariates to reduce variance. The optimal coefficients of the multiple covariates can also be derived. Ratio metric instead of regular output X can be used as the data size becomes smaller by using the ratio metric, which helps with the performance by reducing memory. For example, when determining the number of orders per active day for a customer, the numerator can be number of orders of the customer and the denominator can be number of days the customer was active. In cases where the number is a whole number (e.g., number of orders), the denominator can just be 1. Covariates can additionally be represented as a ratio metric.

Let R be a performance metric, $X_i$ be a first performance unit metric with first performance unit values at $i^{th}$ dimension (e.g., time such as $i^{th}$ day), and $Y_i$ be a second performance unit metric with second performance unit values. A performance metric vector $\vec{R}$ can be obtained by dividing an aggregation (i.e., summation) of a first performance unit metric vector $\vec{X_l}$ over a plurality of n dimensions (e.g., plurality of n days) by an aggregation (i.e., summation) of a second performance unit metric vector $\vec{Y_l}$ over the plurality of n dimensions.

For example, the first performance unit metric $X_i$ can measure number of orders made on the $i^{th}$ day with each first performance unit value representing each category (e.g., client). The second performance unit metric $Y_i$ can measure whether or not the client is active (e.g., 0 for not active, 1 for active) on the $i^{th}$ day with each second performance unit value representing each category. The performance metric R can be the number of orders per active day, with each performance value representing each category. The performance metric vector $\vec{R}$ can be obtained by dividing a summation of the first performance unit metric vector $\vec{X_l}$ over a plurality of n days by a summation of the second performance unit metric vector $\vec{Y_l}$ over a plurality of n days. Each performance value of the performance metric R can represent total number of orders per active day for each category.

Mathematically, obtaining the performance metric vector $\vec{R}$ using the first performance unit metric vector $\vec{X}_l$ and the second performance unit metric vector $\vec{Y}_l$ can be represented as $$\vec{R} = \frac{\sum_{i=1}^{n} \vec{X}_i}{\sum_{i=1}^{n} \vec{Y}_i} = \frac{n*\overline{X}}{n*\overline{Y}} = \frac{\overline{X}}{\overline{Y}}$$

where the first performance unit metric vector $\vec{X}_l$ can have a dimension of 1 by N, the second performance unit metric vector $\vec{Y}_l$ can have a dimension of 1 by N, and the performance metric vector $\vec{R}$ can have a dimension of 1 by N. The N can be the number of categories (e.g., number of clients). In other implementations,, the performance metric vector $\vec{R}$, the first performance unit metric vector $\vec{X}_l$, and the second performance unit metric vector $\vec{Y}_l$ can have a dimension of N by 1.

Let $Z_j$ be a control metric, where j=1, . . . , d, (d=number of covariates). Let $U_i^j$ be a first control unit metric with first control unit values at $i^{th}$ dimension (e.g., time such as $i^{th}$ day), and $V_i^j$ be a second control unit metric with second control unit values at $i^{th}$ dimension. A control metric vector $\vec{Z}_j$ can be obtained by dividing an aggregation (i.e., summation) of a first control unit metric vector $\vec{U_i^j}$ over a plurality of n dimensions (e.g., a plurality of n days) by an aggregation (i.e., summation) of a second control unit metric vector $\vec{V_i^j}$ over a plurality of n dimensions. Mathematically, this can be shown as $$\vec{Z_j} = \frac{\sum_{i=1}^{n} \vec{U_i^j}}{\sum_{i=1}^{n} \vec{V_i^j}} = \frac{n*\overline{U^j}}{n*\overline{V^j}} = \frac{\overline{U^j}}{\overline{V^j}}.$$

where the first control unit metric vector $\vec{U_i^j}$ can have a dimension of 1 by N, the second control unit metric vector $\vec{V_i^j}$ can have a dimension of 1 by N, and the control metric vector $\vec{Z}_j$ can have a dimension of 1 by N. The N can be the number of categories (e.g., number of clients).

Let $\vec{C}_j$ be a control mean vector. The control mean vector $\vec{C}_j$ can be obtained by subtracting the control metric vector $\vec{Z}_j$ by an expected value of the control metric vector $E[\vec{Z}_j]$. Mathematically, this can be represented as $$\vec{C_j} = \vec{Z_j} - E[\vec{Z_j}]$$

The control mean vector $\vec{C}_j$ can have a dimension of 1 by N, where the 1 is the number of rows and N is the number of columns. In some embodiments, the control mean vector $\vec{C}_j$, the control metric vector $\vec{Z}_j$, the first control unit metric vector $\vec{U_i^j}$, and the second control unit metric vector $\vec{V_i^j}$ can have dimensions of N by 1, with corresponding changes made to the matrix/vector mutliplications. The N can be the number of categories (e.g., number of clients). Further, a control matrix C of the d control mean vectors can be built. Mathematically, this can be represented as:

$$C = \begin{pmatrix} \vec{C_1} \\ \vdots \\ \vec{C_d} \end{pmatrix} = \begin{pmatrix} \vec{Z_1} - E[\vec{Z_1}] \\ \vdots \\ \vec{Z_d} - E[\vec{Z_d}] \end{pmatrix}$$

Therefore, the control matrix C can have a dimension of d by N. In some embodiments, the control matrix C can have a dimension of N by d represented as:

$$C = (\vec{C_1}, \ldots, \vec{C_d}) = (\vec{Z_1} - E[\vec{Z_1}], \ldots, \vec{Z_d} - E[\vec{Z_1}])$$

Using the derivation from the single covariate, a multiple covariate equation can be built to determine an auxiliary vector of an auxiliary metric. The auxiliary metric equation $R(\theta)$ can be $$R(\theta) = \vec{R} - \sum_{j=1}^{d} \theta_j \vec{C_j} = \vec{R} - \vec{\theta}^T C$$

For each control mean vector $\vec{C}_j$, there can be a corresponding coefficient $\theta_j$ that can be multiplied to subtract from the performance metric vector $\vec{R}$. Similar to the control matrix C, a coefficient vector $\theta$ of the d coefficients can be built. The coefficient vector $\vec{\theta}$ can have a dimension of d by 1, with the transpose of the coefficient vector $\vec{\theta}^T$ having a dimension of 1 by d. Mathematically, this can be represented as $$\vec{\theta}^T = (\theta_1, \ldots, \theta_d)$$

To find an optimal coefficient $\theta_j$ for each covariate, a variance of the auxiliary metric equation $R(\theta)$ can be taken similar to the single covariate.

$$\mathrm{Var}(R(\theta)) = E\left[(\vec{R} - \vec{\theta}^T C)(\vec{R} - \vec{\theta}^T C)\right] - E\left[R - \vec{\theta}^T C\right]^2 =$$
$$\mathrm{Var}(\vec{R}) - 2\vec{\theta}^T E[(\vec{R}C^T)^T] + \vec{\theta}^T E[CC^T]\vec{\theta}$$

where $\mathrm{Var}(\vec{R})$ is a variance of the performance metric vector $\vec{R}$, $E[\vec{R}C]$ is an expectation of the multiplication between the performance metric vector $\vec{R}$ and the control matrix C, and $E[CC^T]$ is an expectation of the multiplication between the control matrix C and the transpose of the control matrix $C^T$. In some embodiments, the quantity $E[(\vec{R}C^T)^T]$ can be represented as $E[\vec{R}C]$ when each vector $\vec{C}_j$ from the matrix C has a dimension of N by 1.

As can be seen in FIGS. 4A and 4B, the variance of the auxiliary metric should be small as possible. To determine the smallest variance of the auxiliary metric, a partial derivate with respect to the coefficient vector θ of the variance Var(R(θ)) can be taken to derive optimal coefficients and set to zero. The optimal coefficients, after taking the partial derivate and equating them to zero, can be determined as $$\vec{\theta}^* = (E[CC^T])^{-1} E[(\vec{R}C^T)^T] = (E[CC^T])^{-1} E[C\vec{R}^T]$$

In some embodiments, the quantity $E[(\vec{R}C^T)^T]$ can be represented as $E[\vec{R}C]$ when each vector $\vec{C}_j$ from the matrix C has a dimension of N by 1.

Now plugging $\vec{\theta}$ to $Var(R(\vec{\theta}))$, the minimum variance can be achieved when $$Var^*(R(\vec{\theta})) = Var(\vec{R}) - E[C\vec{R}^T]^T (E[CC^T])^{-1} E[C\vec{R}^T]$$

where for each entry at row j column k (j,k=1, ..., d). In some embodiments, the quantity $E[(\vec{R}C^T)^T]$ can be represented as $E[\vec{R}C]$ when each vector $\vec{C}_j$ from the matrix C has a dimension of N by 1. The quantities $E[\vec{C}_j \vec{C}_k]$ and $E[\vec{R}\vec{C}_j]$ can further be simplified by the following mathematical derivations.

$$E[\vec{C}_j \vec{C}_k] = Cov(\vec{Z}_j, \vec{Z}_k) = Cov\left(\frac{U^j}{V^j}, \frac{U^k}{V^k}\right)$$

$$E[\vec{C}_j \vec{R}^T] = Cov(\vec{C}_j \vec{R}^T) = Cov(\vec{R}^T, \vec{C}_j) = Cov\left(\frac{X}{Y}, \frac{U^j}{V^j}\right)$$

In some embodiments, the quantity $E[\vec{C}_j \vec{R}^T]$ can be represented $$E[\vec{R}C] = Cov(\vec{R}, \vec{C}) = Cov\left(\frac{X}{Y}, \frac{U^j}{V^j}\right)$$

when each vector $\vec{C}_j$ from the matrix C has a dimension of N by 1.

Since $$\frac{X}{Y} \xrightarrow{P} \frac{\mu_x}{\mu_y},$$

then from the first order Taylor's expansion of $$\frac{X}{Y}$$

at $$\frac{\mu_x}{\mu_y},$$

the following derivation can be obtained:

$$\frac{X}{Y} = \frac{\mu_x}{\mu_y} + \frac{1}{\mu_y}(X - \mu_x) - \frac{\mu_x}{\mu_y^2}(Y - \mu_y) + o_p\left(\left|\frac{X}{Y} - \frac{\mu_x}{\mu_y}\right|\right) =$$

$$\frac{\mu_x}{\mu_y} + \frac{1}{\mu_y}X - \frac{\mu_x}{\mu_y^2}Y + o_p\left(\left|\frac{X}{Y} - \frac{\mu_x}{\mu_y}\right|\right)$$

where $o_p(\cdot)$ denotes higher order of infinitesimal in the sense of converging in probability, i.e.

$$o_p\left(\left|\frac{X}{Y} - \frac{\mu_x}{\mu_y}\right|\right) \Big/ \left(\left|\frac{X}{Y} - \frac{\mu_x}{\mu_y}\right|\right) \xrightarrow{P} 0.$$

Since $U^j/V^j$ i.i.d for j=1, ..., d, let U/V denote the generic variable. Then the equation $$Cov\left(\frac{X}{Y}, \frac{U^j}{V^j}\right)$$

becomes $$Cov\left(\frac{X}{Y}, \frac{U^j}{V^j}\right) = Cov\left(\frac{\mu_u}{\mu_v} + \frac{1}{\mu_v}U - \frac{\mu_u}{\mu_v^2}V + o_p\left(\left|\frac{U}{V} - \frac{\mu_u}{\mu_v}\right|\right),\right.$$

$$\frac{\mu_x}{\mu_y} + \frac{1}{\mu_y}X - \frac{\mu_x}{\mu_y^2}Y + o_p\left(\left|\frac{X}{Y} - \frac{\mu_x}{\mu_y}\right|\right)\right) =$$

$$Cov\left(\frac{\mu_u}{\mu_v} + \frac{1}{\mu_v}U - \frac{\mu_u}{\mu_v^2}V, \frac{\mu_x}{\mu_y} + \frac{1}{\mu_y}X - \frac{\mu_x}{\mu_y^2}Y\right) +$$

$$Cov\left(\frac{\mu_u}{\mu_v} + \frac{1}{\mu_v}U - \frac{\mu_u}{\mu_v^2}V, o_p\left(\left|\frac{X}{Y} - \frac{\mu_x}{\mu_y}\right|\right)\right) + Cov\left(o_p\left(\left|\frac{U}{V} - \frac{\mu_u}{\mu_v}\right|\right),\right.$$

$$\left.\frac{\mu_x}{\mu_y} + \frac{1}{\mu_y}X - \frac{\mu_x}{\mu_y^2}Y\right) + Cov\left(o_p\left(\left|\frac{U}{V} - \frac{\mu_u}{\mu_v}\right|\right), o_p\left(\left|\frac{X}{Y} - \frac{\mu_x}{\mu_y}\right|\right)\right) =$$

$$Cov\left(\frac{\mu_u}{\mu_v} + \frac{1}{\mu_v}U - \frac{\mu_u}{\mu_v^2}V, \frac{\mu_x}{\mu_y} + \frac{1}{\mu_y}X - \frac{\mu_x}{\mu_y^2}Y\right) +$$

$$Cov\left(\frac{\mu_u}{\mu_v} + \frac{V}{\mu_v}\left(\frac{U}{V} - \frac{\mu_u}{\mu_v}\right), o_p\left(\left|\frac{X}{Y} - \frac{\mu_x}{\mu_y}\right|\right)\right) + Cov\left(o_p\left(\left|\frac{U}{V} - \frac{\mu_u}{\mu_v}\right|\right),\right.$$

$$\left.\frac{\mu_x}{\mu_y} + \frac{Y}{\mu_y}\left(\left|\frac{X}{Y} - \frac{\mu_x}{\mu_y}\right|\right)\right) + Cov\left(o_p\left(\left|\frac{U}{V} - \frac{\mu_u}{\mu_v}\right|\right), o_p\left(\left|\frac{X}{Y} - \frac{\mu_x}{\mu_y}\right|\right)\right)$$

Let $X_n$, $Y_n$ be uniformly bounded random variable and support on finite set. Assume that pdf of $X_n$, $p_n$, is uniformly bounded, $$X_n \xrightarrow{P} 0$$

and $Z_n = o_p(X_n)$, as n→∞. Then a property cov($X_n Y_n$, $Z_n$)→0, n→∞ can be achieved.

A proof can be shown to prove the property. From assumptions, it is easy to see that, there exists constants $C_1$, $C_2>0$ such that $\forall x$ as value of $X_n$, $\max(|x|, |xp_n(x)|) \leq C_1$ and $$\text{cov}(X_n, Y_n, Z_n) = E(X_n, Y_n, Z_n) - E(X_n Y_n) E(Z_n) \leq C_2 E(|X_n|) =$$

$$C_2 \int_{|X_n|>1/n} |x_n| p_n(x_n) dx_n + \int_{|X_n|\leq 1/n} |x_n| p_n(x_n) dx_n \leq$$

$$C_1 C_2 \left( P(|X_n|>1/n) + \int_{|X_n|\leq 1/n} dx_n \right) \leq C_1 C_2 \left( P(|X_n|>1/n) + \frac{C_3}{n^d} \right) \to 0$$

as $n \to \infty$.

Using the properties above, $$\text{Cov}\left(\frac{\overline{X}}{\overline{Y}}, \frac{\overline{U^j}}{\overline{V^j}}\right)$$

can be estimated $$\text{Cov}\left(\frac{\overline{X}}{\overline{Y}}, \frac{\overline{U^j}}{\overline{V^j}}\right) \approx \text{Cov}\left(\frac{\mu_u}{\mu_v} + \frac{1}{\mu_v}\overline{U} - \frac{\mu_u}{\mu_v^2}\overline{V}, \frac{\mu_x}{\mu_y} + \frac{1}{\mu_y}\overline{X} - \frac{\mu_x}{\mu_y^2}\overline{Y}\right) =$$

$$\frac{1}{\mu_v \mu_y} \text{cov}(\overline{U}, \overline{X}) - \frac{\mu_u}{\mu_v^2 \mu_y} \text{cov}(\overline{V}, \overline{X}) - \frac{\mu_x}{\mu_v \mu_y^2} \text{cov}(\overline{U}, \overline{Y}) + \frac{\mu_u \mu_x}{\mu_v^2 \mu_y^2} \text{cov}(\overline{V}, \overline{Y}),$$

where $\text{cov}(\overline{U}, \overline{X})$, $\text{cov}(\overline{V}, \overline{X})$, $\text{cov}(\overline{U}, \overline{Y})$ and $\text{cov}(\overline{V}, \overline{Y})$ can be estimated from samples.

Additionally, $$\text{Cov}\left(\frac{\overline{U^j}}{\overline{V^j}}, \frac{\overline{U^k}}{\overline{V^k}}\right)$$

can be derived in a similar manner.

$$\text{Cov}\left(\frac{\overline{U^j}}{\overline{V^j}}, \frac{\overline{U^k}}{\overline{V^k}}\right) \approx \text{Cov}\left(\frac{\mu_u}{\mu_v} + \frac{1}{\mu_v}\overline{U} - \frac{\mu_u}{\mu_v^2}\overline{V}, \frac{\mu_u}{\mu_v} + \frac{1}{\mu_v}\overline{U} - \frac{\mu_u}{\mu_v^2}\overline{V}\right) =$$

$$\frac{1}{\mu_v^2} \text{cov}(\overline{U}, \overline{U}) - 2 * \frac{\mu_u}{\mu_v^3} \text{cov}(\overline{V}, \overline{U}) + \frac{\mu_u^2}{\mu_v^4} \text{cov}(\overline{V}, \overline{V}),$$

where $\text{cov}(\overline{U}, \overline{U})$, $\text{cov}(\overline{V}, \overline{U})$, $\text{cov}(\overline{V}, \overline{V})$ can be estimated from samples.

A mathematical equation of deriving a closed form solution for the optimal coefficients of multiple covariates for individual value of the auxiliary metric can be determined. Additionally, each data element (i.e., category) can be adjusted as the following equation.

$$R(\theta)_i = R_i - \sum_{j=1}^{d} \theta_j C_{j,i} = R_i - \theta^T C_i$$

Where $R_i = \frac{X_i}{Y_i}$, $C_{j,i} = Z_{j,i} - E[Z_j]$, $Z_{j,i} = \frac{U_i^j}{V_i^j}$, and $C_i = \begin{pmatrix} \overrightarrow{C_{1,i}} \\ \vdots \\ \overrightarrow{C_{d,i}} \end{pmatrix} = \begin{pmatrix} \overrightarrow{Z_{1,i}} - E[\overrightarrow{Z_1}] \\ \vdots \\ \overrightarrow{Z_{d,i}} - E[\overrightarrow{Z_d}] \end{pmatrix}$ and $\theta^T = (\theta_1, \ldots, \theta_d)$.

Additionally, a multiple covariate equation can be represented $Y = Y_1 - \theta_a*(Y_a - \overline{Y_a}) - \theta_b*(Y_b - \overline{Y_b}) - \ldots - \theta_n*(Y_n - \overline{Y_n})$, where $Y_1$ is a ratio metric R, $Y_a$ is a first covariate $Z_1$, $\theta_a$ is a first coefficient, $Y_n$ is $n^{th}$ covariate $Z_n$, and $\theta_n$ is $n^{th}$ coefficient.

A server computer can store performance metric comprising pre-experiment data (i.e., first values) and experiment outcome (i.e., performance values or second values) of a software application. The pre-experiment data can be a set of first values of the performance metric collected by the server computer using the first version (e.g., historical data 502) of a software application for each of the plurality of categories. The set of first values can be collected during the first time period (e.g., pre-experiment period). The first version of the software application can have a first option for a particular functionality of the software application. The experiment outcome can be data collected during an experimental analysis (e.g., A/B testing) where a treatment variable is introduced for a second version (e.g., newer version).

For example, a treatment variable can be a UI change, the first version can be UI before the change and the second version can be UI after the change. The experiment outcome can be performance value collected for both the first version and the second version of the software application during a second time period (e.g., experiment period) for each of the plurality of categories. For example, the experiment outcome can be number of orders, and the experiment outcome for the first version can be number of orders before the UI change in the software application and the second version can be number of orders after the UI change in the software application.

Since the experiment outcome often has high variance, the server computer can determine an auxiliary metric using the performance value of the performance metric reduced by the d control values respectively weighted by corresponding values of the coefficient vector $\theta$ to reduce variance for each plurality of categories of the clients. The plurality of categories can include at least 100 categories. The server computer can then use the auxiliary metric to accurately determine which version of the software application led to better experiment outcome by comparing the second version of the software application into the first version of the software application for each of the plurality of categories.

As an illustrative example, consider an A/B experiment of a delivery company testing whether a new version of a software application (i.e., treatment variable) increases number of orders. Consider a performance metric to be a number of orders per merchant for a food delivery company. An exemplary data table including the performance metric can be seen in Table 3.

TABLE 3

| Person | New Version | OrdersA0 | OrdersA1 | OrdersB |
|---|---|---|---|---|
| 1 | 0 | 5 | 8 | 2 |
| 2 | 1 | 2 | 7 | 3 |
| 3 | 0 | 4 | 9 | 1 |

TABLE 3-continued

| Person | New Version | OrdersA0 | OrdersA1 | OrdersB |
|---|---|---|---|---|
| 4 | 0 | 5 | 8 | 1 |
| 5 | 0 | 5 | 8 | 0 |

OrdersA0 column can be the pre-experiment outcome of number of orders generated by each person during the first time period (e.g., before new version of a software application is introduced). The OrdersA0 can be one control metric. The experiment can then start, and the treatment variable can be applied. Orders1 column can be experiment outcome of orders generated using a new version of a software application (New Version=1) and not using a new version of a software application (New Version=0) during the second time period. The Orders1 can be performance metric. OrdersB can be number of orders generated by each person using a different delivery company's software (a covariate). The OrdersB can be another control metric.

Once the pre-experiment outcome, the experiment outcome, and orders using a different delivery company's software are measured, then the pre-experiment outcome and orders using a different delivery company's software can be used as covariates. The regression can be expressed as $R(\theta) = \vec{R} - \sum_{j=1}^{d} \theta_j \vec{C}_j = \vec{R} - \theta_1 * \vec{C}_1 - \theta_2 * \vec{C}_2 = \vec{R} - \theta_1 * (\vec{Z}_1 - E[\vec{Z}_1]) - \theta_2 * (\vec{Z}_2 - E[\vec{Z}_2]) = \vec{R} - \vec{\theta}^T C$, where a performance metric vector $\vec{R}$ is OrdersA1 column control metric vector $\vec{Z}_1$ is OrdersA0 column, control metric vector $\vec{Z}_2$ is OrdersB column, and $R(\theta)$ is an auxiliary metric vector for number of orders.

The control mean vectors $\vec{C}_1$ and $\vec{C}_2$ can be determined by performing following calculations:

covariate #1 $\vec{C}_1$ corresponding to OrdersA0 is $$\vec{Z}_1 = (5, 2, 4, 5, 5), E[\vec{Z}_1] = 4.2$$

$$\vec{C}_1 = \vec{Z}_1 - E[\vec{Z}_1] = (0.8, -2.2, -0.2, 0.8, 0.8)$$

covariate #2 $\vec{C}_2$ corresponding to OrdersB is $$\vec{Z}_2 = (2, 3, 1, 1, 0), E[\vec{Z}_2] = 1.4$$

$$\vec{C}_2 = \vec{Z}_2 - E[\vec{Z}_2] = (0.6, 1.6, -0.4, -0.4, -1.4)$$

The coefficients vector $\vec{\theta}$ can then be determined by performing a closed form solution using the methods above that minimizes the variance to determine the auxiliary metric for number of orders. Determining the coefficient vector $\vec{\theta}$ can involve the performance metric vector $\vec{R}$ corresponding to OrdersA1 column and the control mean vectors $\vec{C}_1$ and $\vec{C}_2$. The coefficient vector $\vec{\theta}$ can be determined by performing following calculations:

The performance metric vector $\vec{R}$ corresponding to OrdersA1 column:

$$\vec{R} = (8, 7, 9, 8, 8)$$

The control matrix C is the following matrix $$C = \begin{pmatrix} C_1 \\ C_2 \end{pmatrix} = \begin{pmatrix} 0.8 & -2.2 & -0.2 & 0.8 & 0.8 \\ 0.6 & 1.6 & -0.4 & -0.4 & -1.4 \end{pmatrix}$$

Using the control matrix C and the performance metric vector $\vec{R}$, the coefficient vector $\vec{\theta}$ can be obtained $$\vec{\theta}^* = (E[CC^T])^{-1} E[C\vec{R}^T]$$

$$(E[CC^T])^{-1} = \left( E\left[ \begin{pmatrix} 0.8 & -2.2 & -0.2 & 0.8 & 0.8 \\ 0.6 & 1.6 & -0.4 & -0.4 & -1.4 \end{pmatrix} * \begin{pmatrix} 0.8 & 0.6 \\ -2.2 & 1.6 \\ -0.2 & -0.4 \\ 0.8 & -0.4 \\ 0.8 & -1.4 \end{pmatrix} \right] \right)^{-1} =$$

$$\left( E\begin{bmatrix} 6.8 & -4.4 \\ -4.4 & 5.2 \end{bmatrix} \right)^{-1} = \begin{bmatrix} 13/40 & 11/40 \\ 11/40 & 17/40 \end{bmatrix}$$

$$E[C\vec{R}^T] = \left( E\left[ \begin{pmatrix} 0.8 & -2.2 & -0.2 & 0.8 & 0.8 \\ 0.6 & 1.6 & -0.4 & -0.4 & -1.4 \end{pmatrix} * \begin{pmatrix} 8 \\ 7 \\ 9 \\ 8 \\ 8 \end{pmatrix} \right] \right) = \begin{pmatrix} 2 \\ -2 \end{pmatrix}$$

$$(E[CC^T])^{-1} E[\vec{R}C] = \begin{bmatrix} \frac{13}{40} & \frac{11}{40} \\ \frac{11}{40} & \frac{17}{40} \end{bmatrix} * \begin{pmatrix} 2 \\ -2 \end{pmatrix} = (0.1 \quad -0.3)^T$$

$$\vec{\theta}^* = (0.1 \quad -0.3)^T$$

Putting this back to the equation, the auxiliary metric vector $R(\theta)$ can be determined. The auxiliary metric vector $R(\theta)$ can have a smaller variance than the performance metric vector $\vec{R}$. The auxiliary metric $R(\theta)$ can be determined by performing the following calculation:

$$R(\theta) =$$

$$\vec{R} - \vec{\theta}^T C = (8\ 7\ 9\ 8\ 8) - (0.1\ -0.3) * \begin{pmatrix} 0.8 & -2.2 & -0.2 & 0.8 & 0.8 \\ 0.6 & 1.6 & -0.4 & -0.4 & -1.4 \end{pmatrix} =$$

$$(8.1\ 7.7\ 8.9\ 7.8\ 7.5)$$

C. Method

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The closed form solution of obtaining coefficients for multiple covariates may be carried out using the aspect method disclosed in greater detail with reference to FIGS. 11A and 11B.

Figure 11A:
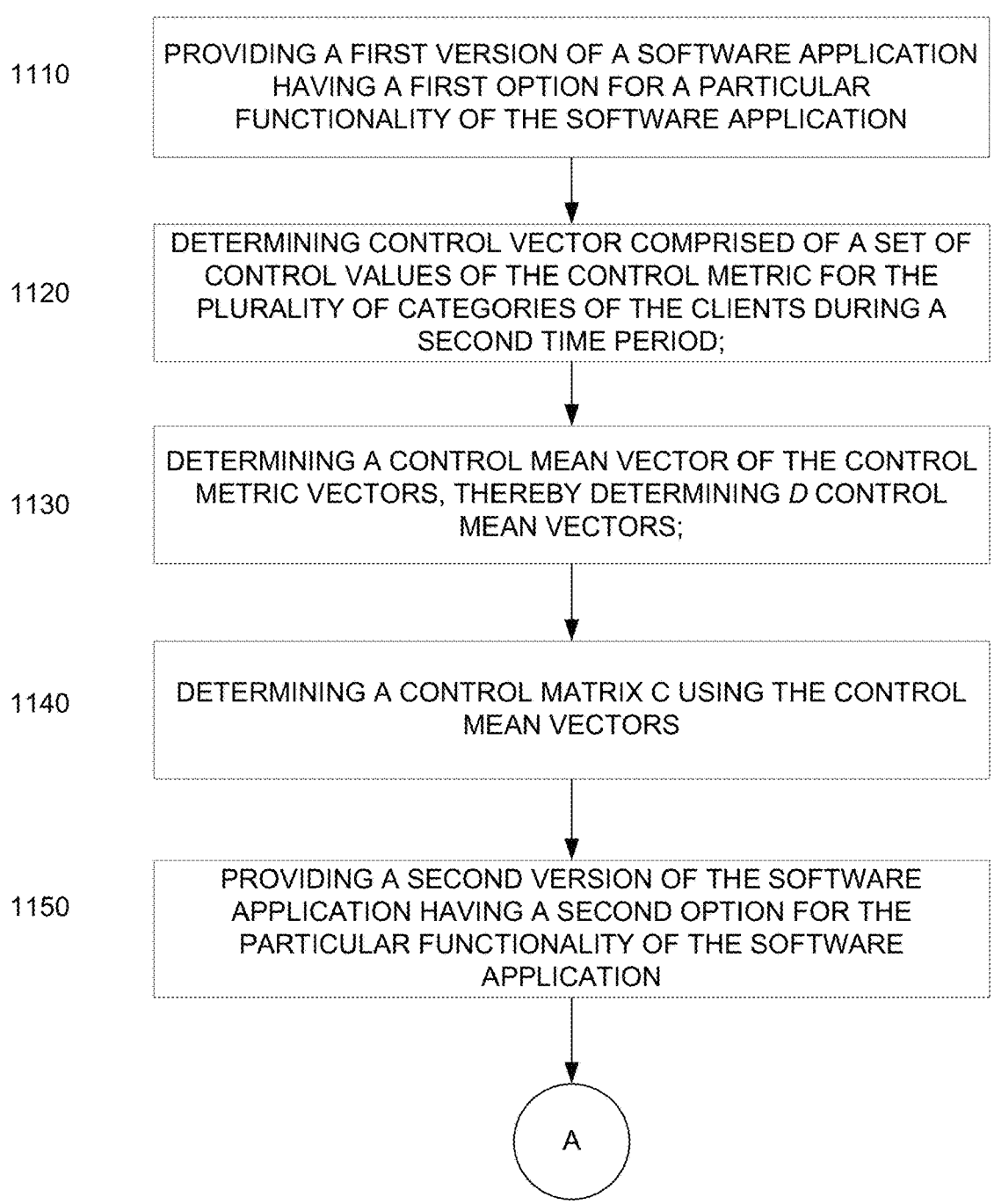
FIGS. 11A and 11B show flow diagrams of determining a closed-form solution for determining coefficients of multiple covariates.
Figure 11B:
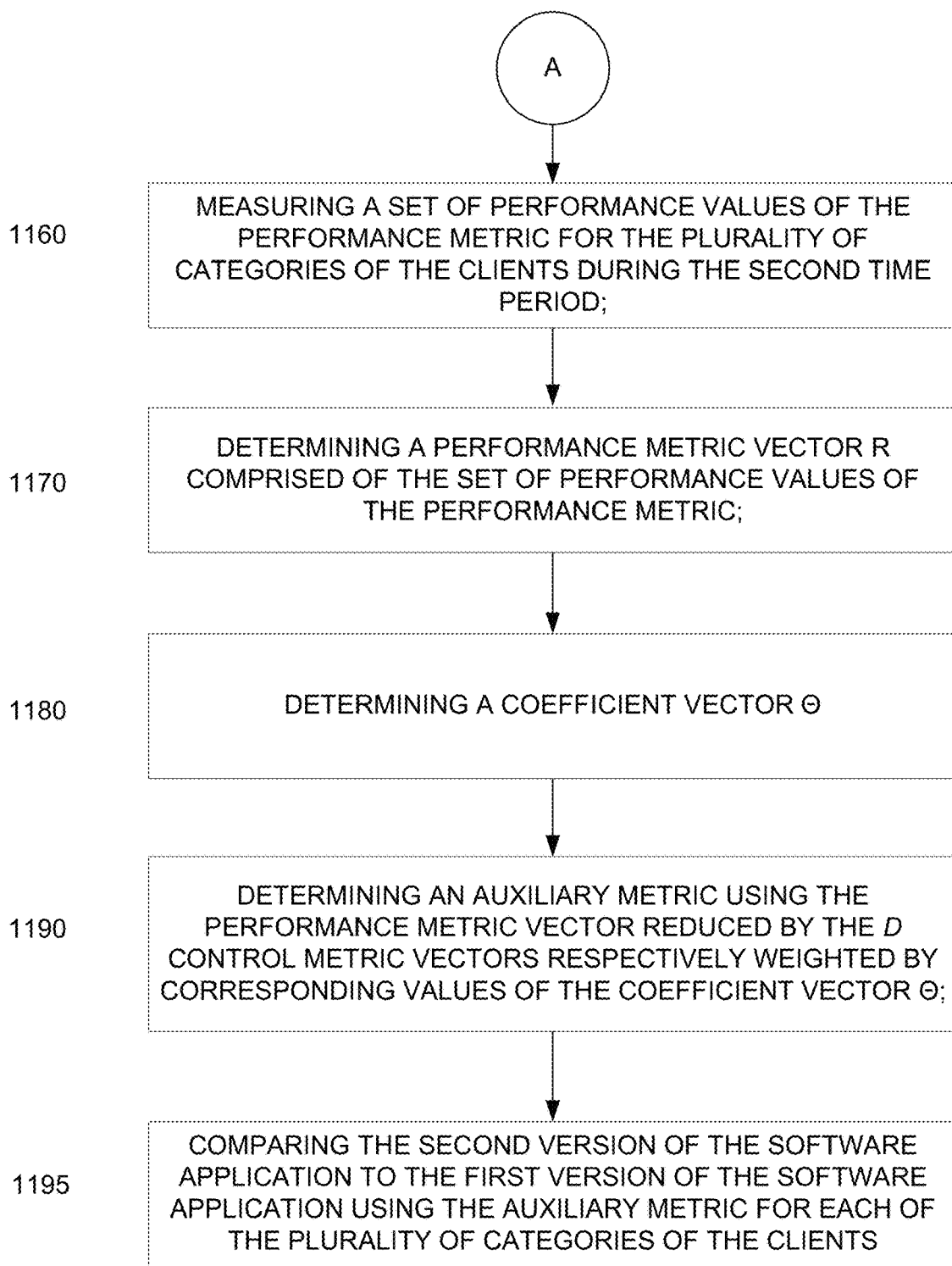

FIGS. 11A and 11B are flow charts illustrating a method of closed form solution for obtaining coefficients for multiple covariates. The method can be performed by an example server computer 302 in FIG. 3. The method can also be used by other computers, individuals, group of individuals, etc. and implementations herein are not limited to the particular examples provided.

In block 1110, the server computer can provide the first version of a software application having a first option for a particular functionality of the software application. For example, a server computer can provide a software application with a user interface (i.e., first option) that provides easy access (i.e., particular functionality) to different functionalities of the software application. The server computer can provide the first version of the software application to clients that belong to a plurality of categories. For example, a client can correspond to a merchant, with each category representing each merchant, e.g., in a geographical area. The plurality of categories can include at least 100 categories.

In block 1120, the server computer can determine a control vector $\vec{Z}_j$ comprised of a set of control values of a control metric for the plurality of categories of the clients during a second time period. The control metric can be covariant with a performance metric of the first version of the software application during a first time period. The control vector $\vec{Z}_j$ can be determined by dividing an aggregation (i.e., summation) of a first control unit metric vector $\vec{U}_i^j$ over a plurality of n dimensions (e.g., a plurality of n days) by an aggregation (i.e., summation) of a second control unit metric vector $\vec{V}_i^j$ over a plurality of n dimensions. The first control unit metric $U_i^j$ can have first control unit values at $i^{th}$ dimension (e.g., time such as $i^{th}$ day), and the second control unit metric $V_i^j$ can have second control unit values at $i^{th}$ dimension. Mathematically, this can be represented as $$\vec{Z}_J = \frac{\Sigma_{i=1}^n \vec{U}_i^j}{\Sigma_{i=1}^n \vec{V}_i^j} = \frac{n*\vec{U}^j}{n*\vec{V}^j} = \frac{\vec{U}^j}{\vec{V}^j}.$$

Examples of the control metric can be forecast metric, weather, holidays, etc. The control vector $\vec{Z}_j$, the first control unit metric vector $\vec{U}_i^j$, and the second control unit metric vector $\vec{V}_i^j$ can have a dimension of 1 by N, where N is the plurality of categories.

In block 1130, the server computer can determine a control mean vector $\vec{C}_j$. The control mean vector $\vec{C}_j$ can be determined by subtracting the control metric vector $\vec{Z}_j$ by an expected value of the control vector $E[\vec{Z}_j]$. The expected value of the control vector $E[\vec{Z}_j]$ can be obtained by taking an average of all the control values of the control vector $\vec{Z}_j$. Mathematically, this can be represented as $\vec{C}_j=\vec{Z}_j-E[\vec{Z}_j]$. The control mean vector $\vec{C}_j$ can have a dimension of 1 by N, whee N is the plurality of categories.

The blocks 1120 and 1130 can be repeated until the control mean vector $C_j$ can be determined for each j of d control metrics that are covariant with a performance metric of the first version of the software application during the first time period. The d control metrics can be a total number of control metrics covariant to the performance metric of the first version of the software application during a first time period. In some embodiments, the performance metric of the first version can be a control metric.

In block 1140, the server computer can determine a control matrix C. The control matrix C can be determined by combining d control mean vectors $\vec{C}_j$. The control matrix C can be mathematically represented as $$C = \begin{pmatrix} \vec{C}_1 \\ \vdots \\ \vec{C}_d \end{pmatrix} = \begin{pmatrix} \vec{Z}_1 - E[\vec{Z}_1] \\ \vdots \\ \vec{Z}_d - E[\vec{Z}_d] \end{pmatrix}$$

where the control matrix C can be a matrix with a dimension of d rows and N column, or d by N. The N can be the plurality of categories.

In block 1150, the server computer may develop a second version of the software application that can perform same functionality as the first version but with a different option (e.g., UI), and want to determine which version of the software application can result in better experiment outcome. The server computer can provide the second version of the software application having a second option for the particular functionality. The server computer can provide the second version of the software application to clients that belong to a plurality of categories. For example, in FIG. 2, the server computer can give the first software application to a first user device while giving the second software application to a second user device.

In block 1160, the server computer can measure a set of performance values of the performance metric for the plurality of categories of the clients during the second time period. The performance values of the performance metric can be experiment outcome measured for both the first version of the software application and the second version of the software application.

In block 1170, the server computer can determine a performance metric vector $\vec{R}$. A performance metric vector $\vec{R}$ can be obtained by dividing an aggregation (i.e., summation) of a first performance unit metric vector $\vec{X}_i$ over a plurality of n dimensions (e.g., a plurality of n days) by an aggregation (i.e., summation) of a second performance unit metric vector $\vec{Y}_i$ over the plurality of n dimensions. The first performance unit metric $X_i$ can have first performance unit values at $i^{th}$ dimension (e.g., time such as $i^{th}$ day). The second performance unit metric $Y_i$ can have the second performance unit values at $i^{th}$ dimension. Mathematically, this can be represented as $$\vec{R} = \frac{\Sigma_{i=1}^n \vec{X}_i}{\Sigma_{i=1}^n \vec{Y}_i} = \frac{n*\vec{X}}{n*\vec{Y}} = \frac{\vec{X}}{\vec{Y}}.$$

The performance metric vector $\vec{R}$ can have a dimension of 1 by N, where N is the plurality of categories.

As an example illustration, the first performance unit metric $X_i$ can measure number of orders made on the $i^{th}$ day with each first performance unit value representing each category (e.g., client). The second performance unit metric $Y_i$ can measure whether or not the client is active (e.g., 0 for not active, 1 for active) on the $i^{th}$ day with each second performance unit value representing each category. The performance metric R can be the number of orders per active day, with each performance value representing each category. The performance metric vector $\vec{R}$ can be obtained by dividing a summation of the first performance unit metric vector $\vec{X}_I$ over a plurality of n days by a summation of the second performance unit metric vector $\vec{Y}_I$ over a plurality of n days. Each performance value of the performance metric R can represent total number of orders per active day for each category.

In block 1180, the server computer can subtract the control matrix C from the performance metric vector $\vec{R}$ to determine an auxiliary vector of an auxiliary metric. When subtracting the control matrix C from the performance metric vector $\vec{R}$, the control matrix C can be multiplied by a transpose of a coefficient vector $\vec{\theta}$. The coefficient vector $\vec{\theta}$ can be determined by obtaining a unique coefficient value $\theta_j$ for each d control mean values. The transpose of the coefficient vector $\vec{\theta}^T$ can be mathematically represented as $(\theta_1, \ldots, \theta_j, \ldots, \theta_d)^T$. to determine the coefficient vector $\vec{\theta}$, the variance of the auxiliary vector $R(\theta)$ can be taken, and to obtain the smallest variance, a partial derivative of the variance of the auxiliary vector $R(\theta)$ can be set to zero to obtain optimal coefficient vector $\vec{\theta}$. Mathematically, the optimal coefficient vector $\theta$ can be obtained by the following equation: $\vec{\theta}^* = (E[CC^T])^{-1}E[C\vec{R}^T]$.

In block 1190, the server computer can determine the auxiliary vector of the auxiliary metric using the performance vector R subtracted by the optimal coefficient vector $\theta^T$ multiplied by the control matrix C. Each of d control metric vector in the control matrix C can be respectively weighted by corresponding values of the coefficient vector $\theta$. Mathematically, the auxiliary equation determining the auxiliary vector can be represented as $R(\theta) = \vec{R} - \Sigma_{j=1}^{d} \theta_j \vec{C}_j = \vec{R} - \vec{\theta}^T C$.

In block 1195, the server computer can compare the second version of the software application to the first version of the software application using the auxiliary metric. The server computer can compare the two versions to determine which version of the software application leads to better experiment outcome. For example, if a delivery service provider is trying to determine whether changing UI leads to increase in number of orders, the delivery service provider can compare number of orders for a first version (before the UI change) and a second version (after the UI change) to determine whether second version led to increase in number of orders. Upon making the comparison, the server computer can decide which version of the software application is better. Depending on the experiment outcome, the server computer can compare auxiliary metric for one or more of the plurality of categories.

VII. Computer System

Figure 12:
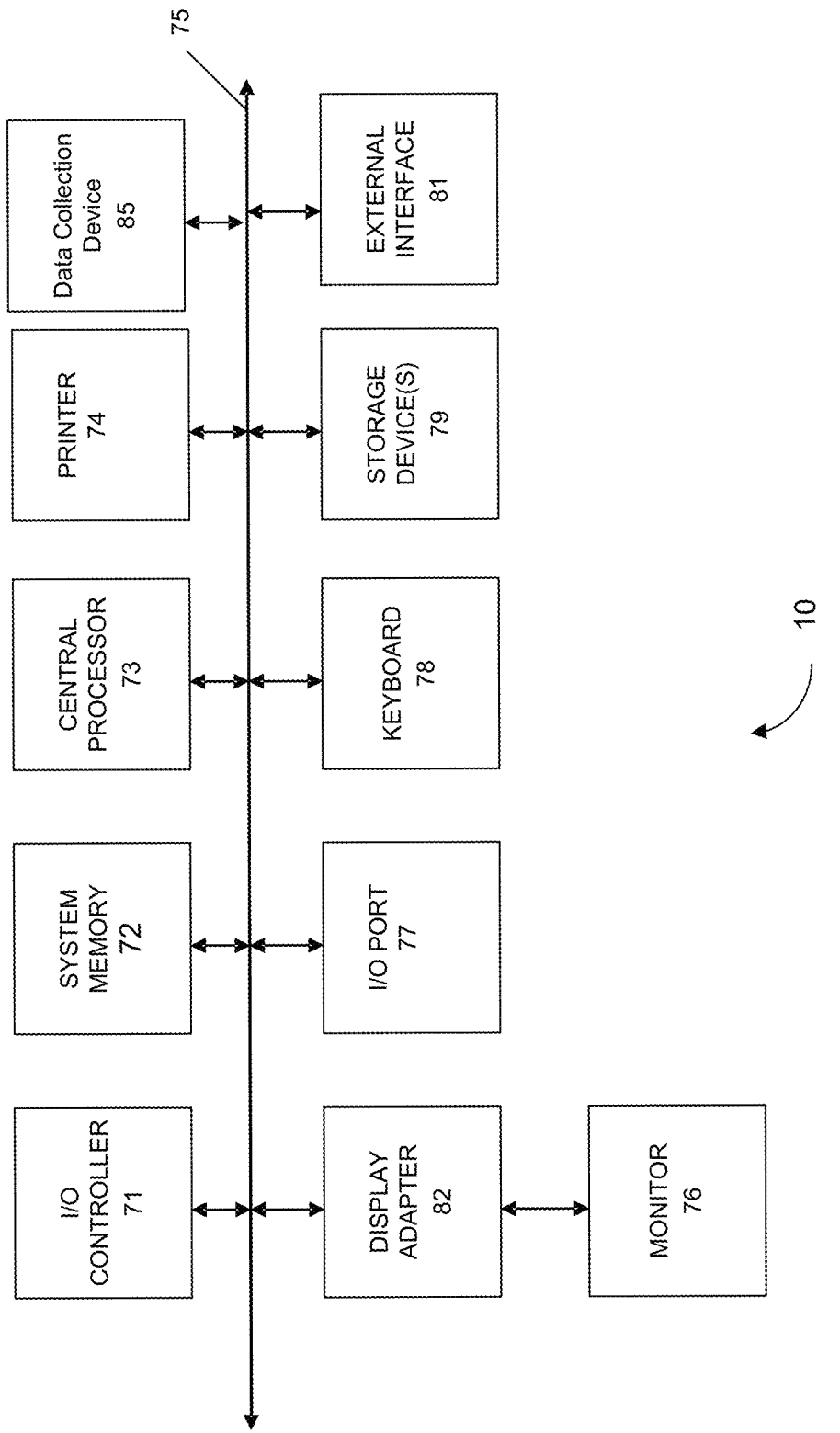
FIG. 12 shows a block diagram of an example computer system usable with systems and methods according to embodiments of the present disclosure.

Any of the computer systems mentioned herein may utilize any suitable number of subsystems. Examples of such subsystems are shown in FIG. 12 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 12 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g., an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Any operations performed with a processor (e.g., aligning, determining, comparing, computing, calculating) may be performed in real-time. The term "real-time" may refer to computing operations or processes that are completed within a certain time constraint. The time constraint may be 1 minute, 1 hour, 1 day, or 7 days. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

The claims may be drafted to exclude any element which may be optional. As such, this statement is intended to serve as antecedent basis for use of such exclusive terminology as "solely", "only", and the like in connection with the recitation of claim elements, or die use of a "negative" limitation.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method comprising:
   providing a first version of a software application having a first option for a particular functionality of the software application, wherein clients of the software application belong to a plurality of categories, wherein the plurality of categories includes at least 100 categories;
   for each category of the plurality of categories, measuring a set of first values of a performance metric of the clients using the first version of the software application, the set of first value measured over a first time period and includes at least 1000 values;
   determining a predicted value of the performance metric for each of the plurality of categories of the clients during a second time period, the predicted value determined based on the set of first values of the performance metric during the first time period, and the predicted value accounting for a temporal behavior of the set of first values of the performance metric, wherein the second time period is a current or future time period;
   providing a second version of the software application having a second option for the particular functionality of the software application;
   measuring a second value of the performance metric for each of the plurality of categories of the clients during the second time period;
   for each of the plurality of categories of the clients, determining an auxiliary metric using the second value of the performance metric and the predicted value; and
   comparing the second version of the software application to the first version of the software application using the auxiliary metric for each of the plurality of categories of the clients.

2. The method of claim 1, wherein the predicted value is determined using a time series model.

3. The method of claim 2, wherein the time series model comprises a time series data slicer module, a data preprocessing module, a forecasting module, and a prediction processing module.

4. The method of claim 3, wherein the time series data slicer module transforms the set of first values of the performance metric during the first time period into different time units or frequencies to determine transformed historical data.

5. The method of claim 3, wherein the data preprocessing module performs adjustments to the set of first values to determine adjusted historical data, and wherein the forecasting module determines the predicted value using the adjusted and transformed historical data.

6. The method of claim 3, wherein the prediction processing module performs adjustments on the predicted value, wherein the adjustments include removing effects of outliers.

7. The method of claim 1, wherein the predicted value is determined using a regression that best fits the set of first values of the performance metric.

8. The method of claim 1, wherein the auxiliary metric is determined by subtracting the predicted value from the second value of the performance metric.

9. The method of claim 1, wherein the auxiliary metric is determined by subtracting a value from the second value of the performance metric, wherein the value is determined by subtracting an average of predicted values from the plurality of categories by the predicted value.

10. The method of claim 1, further comprising:
determining a control distribution using the auxiliary metric for the plurality of categories provided with the first version of the software application;
determining a treatment distribution using the auxiliary metric for the plurality of categories provided with the second version of the software application; and
comparing the control distribution and the treatment distribution to determine which version of the software application provides better performance.

11. The method of claim 10, further comprising:
determining the second version of the software application is better than the first version of the software application; and
deploying the second version of the software application to the clients of the software application.

12. The method of claim 1, wherein each category in the plurality of categories is a different service provider for a service within the software application.

13. A computing device comprising:
one or more processors; and
a computer readable medium coupled to the one or more processors and containing instructions for causing the one or more processors to perform a method comprising:
providing a first version of a software application having a first option for a particular functionality of the software application, wherein clients of the software application belong to a plurality of categories, wherein the plurality of categories includes at least 100 categories;
for each category of the plurality of categories, measuring a set of first values of a performance metric of the clients using the first version of the software application, the set of first value measured over a first time period and includes at least 1000 values;
determining a predicted value of the performance metric for each of the plurality of categories of the clients during a second time period, the predicted value determined based on the set of first values of the performance metric during the first time period, and the predicted value accounting for a temporal behavior of the set of first values of the performance metric, wherein the second time period is a current or future time period;
providing a second version of the software application having a second option for the particular functionality of the software application;
measuring a second value of the performance metric for each of the plurality of categories of the clients during the second time period;
for each of the plurality of categories of the clients, determining an auxiliary metric using the second value of the performance metric and the predicted value; and
comparing the second version of the software application to the first version of the software application using the auxiliary metric for each of the plurality of categories of the clients.

14. The computing device of claim 13, wherein the method further comprises:
determining a control distribution using the auxiliary metric for categories provided with the first version of the software application;
determining a treatment distribution using the auxiliary metric for categories provided with the second version of the software application; and
comparing the control distribution and the treatment distribution to determine which version of the software application provides better performance.

15. The computing device of claim 14, further comprising:
determining the second version of the software application is better than the first version of the software application; and
deploying the second version of the software application to the clients of the software application.

16. The computing device of claim 13, wherein each category in the plurality of categories is a different service provider for a service within the software application.

17. A non-transitory computer readable medium containing instructions, that when executed, cause one or more processors to perform operations comprising:
providing a first version of a software application having a first option for a particular functionality of the software application, wherein clients of the software application belong to a plurality of categories, wherein the plurality of categories includes at least 100 categories;
for each category of the plurality of categories, measuring a set of first values of a performance metric of the clients using the first version of the software application, the set of first value measured over a first time period and includes at least 1000 values;
determining a predicted value of the performance metric for each of the plurality of categories of the clients during a second time period, the predicted value determined based on the set of first values of the performance metric during the first time period, and the predicted value accounting for a temporal behavior of the set of first values of the performance metric, wherein the second time period is a current or future time period;
providing a second version of the software application having a second option for the particular functionality of the software application;
measuring a second value of the performance metric for each of the plurality of categories of the clients during the second time period;
for each of the plurality of categories of the clients, determining an auxiliary metric using the second value of the performance metric and the predicted value; and
comparing the second version of the software application to the first version of the software application using the auxiliary metric for each of the plurality of categories of the clients.

18. The computer readable medium of claim 17, further comprising:
- determining a control distribution using the auxiliary metric for the plurality of categories provided with the first version of the software application;
- determining a treatment distribution using the auxiliary metric for the plurality of categories provided with the second version of the software application; and
- comparing the control distribution and the treatment distribution to determine which version of the software application provides better performance.

19. The computer readable medium of claim 18, further comprising:
- determining the second version of the software application is better than the first version of the software application; and
- deploying the second version of the software application to the clients of the software application.

20. The computer readable medium of claim 17, wherein each category in the plurality of categories is a different service provider for a service within the software application.

* * * * *